United States Patent
Kunii

[19]

[11] Patent Number: 6,089,364
[45] Date of Patent: Jul. 18, 2000

[54] HYDRAULIC PRESSURE-CONTROL VALVE FOR AUTOMATIC VEHICLE TRANSMISSION

[75] Inventor: Rikiya Kunii, Wako, Japan

[73] Assignee: Honda Giken Kogyo Kabushiki Kaisha, Tokyo, Japan

[21] Appl. No.: 09/340,194

[22] Filed: Jun. 28, 1999

[30] Foreign Application Priority Data

Nov. 28, 1996 [JP] Japan .................................. 8-332732

[51] Int. Cl.$^7$ ............................ F16D 19/00; F16D 11/00; F15B 13/044; F15B 11/08
[52] U.S. Cl. .................................. 192/85 R; 192/109 F; 91/459; 91/461
[58] Field of Search ............................ 192/85 R, 109 F, 192/3, 57; 91/433, 418, 459, 461, 468

[56] References Cited

U.S. PATENT DOCUMENTS

| | | | |
|---|---|---|---|
| 3,621,955 | 11/1971 | Black et al. ..................... | 192/109 F X |
| 3,625,322 | 12/1971 | Nagamatsu et al. ............. | 192/85 R X |
| 3,672,243 | 6/1972 | Murakami et al. ............. | 192/109 F X |
| 4,033,201 | 7/1977 | Sakai ................................ | 192/109 F X |
| 4,523,513 | 6/1985 | Gudat et al. ..................... | 91/459 X |
| 5,839,345 | 11/1998 | Sandau et al. ..................... | 94/459 X |

*Primary Examiner*—Charles A Marmor
*Assistant Examiner*—Roger Pang
*Attorney, Agent, or Firm*—Armstrong, Westerman, Hattori, McLeland & Naughton

[57] ABSTRACT

A hydraulic pressure-control valve for controlling a pressure to be supplied to a frictional engaging element such as a start clutch in an automatic vehicle transmission, including a first pressure-regulating valve connected to a hydraulic pressure source and connected to the frictional engaging element through a second passage, and a solenoid for displacing the first-pressure-regulating valve. A second pressure-regulating valve is provided and is connected to the first pressure-regulating valve to receive the output hydraulic pressure, the first pressure-regulating and the second pressure-regulating valve are connected such that the output hydraulic pressure varies in response to the command input according to a first characteristic, while the output hydraulic pressure varies in response to the command input according to a second characteristic when the command input exceeds a predetermined value, wherein the output hydraulic pressure according to the first characteristic per unit of command input is less than the output hydraulic pressure according the second characteristic, thereby reducing load hysteresis and improving control accuracy in a low pressure region, while enabling to secure high torque capacity in a high pressure region.

8 Claims, 22 Drawing Sheets

HYDRAULIC PRESSURE-CONTROL VALVE FOR AUTOMATIC VEHICLE TRANSMISSION

BACKGROUND OF THE INVENTION

1. Field of the Invention

This invention relates to a hydraulic pressure-control valve for an automatic vehicle transmission, more specifically to an improved hydraulic pressure-control to be used for engaging a frictional engaging element such as a start clutch in an automatic vehicle transmission.

2. Description of the Related Art

Automatic vehicle transmission start devices include the start clutch of the continuously variable transmission and the lock-up clutch of the torque converter of the continuously variable/multi-step transmission. As taught by Japanese Patent Laid-Open Application Nos. Sho 62(1987)—238,129 and Hei 2 (1990)—150,554, for example, the start clutch is controlled for smooth vehicle starting (creeping) by regulating the hydraulic pressure (to be supplied) with an electric actuator, specifically, an electromagnetic solenoid valve (clutch control valve).

Other hydraulic pressure-control valves aside from those the prior art referred to above are also known, such as the one illustrated in FIG. 22. The illustrated pressure-control valve has a spring 102 and a pressure-regulating valve 104 disposed opposite an electromagnetic linear solenoid 100.

The pressure-regulating valve 104 is biased to the left in the drawing by the spring 102. When the plunger 100a of the linear solenoid 100 is excited, it moves to the right in the drawing against the spring force and presses the pressure-regulating valve 104 to the right.

In this specification, words indicating direction such as left, right, up and down mean direction in the drawings.

Hydraulic pressure from a hydraulic pressure source (not shown) regulated to line pressure CR is supplied through a line-pressure supply line (passage) 106, passes through a gap defined by the position of the pressure-regulating valve 104 and a valve body 108, proceeds to an output line (passage) 110 and is supplied to the hydraulic chamber of a start clutch (not shown).

A feedback line (passage) 112 branching from the output line 110 feeds part of the output pressure back to the rear end of the pressure-regulating valve 104. In the course of hydraulic pressure being supplied to instigate clutch engagement, when the leftward force on the valve owing to the feedback pressure becomes equal to be solenoid load, the gap between the pressure-regulating valve 104 and the valve body 108 is closed to stop the hydraulic pressure increase. The hydraulic pressure (to be supplied to the clutch) thus varies with the increase/decrease in the current through the solenoid (the solenoid load). The portions marked with x's in the drawing are drain ports.

As shown by the characteristic curve in FIG. 23, the hydraulic pressure to be supplied to the clutch by the conventional pressure-control valve shown in FIG. 22 is a linear function of the solenoid current (solenoid load). Therefore, when hydraulic pressure control is effected in the region where the vehicle is creeping or starting or in the region where low torque capacity hydraulic pressure control is effected at the lock-up clutch of the torque converter (i.e., the clutch is slip-controlled), the control is difficult to achieve with good precision owing to the large effect of solenoid hysteresis, as can be seen from the characteristic curve of FIG. 24 showing how hydraulic pressure (to be supplied to the clutch) varies with solenoid current.

Moreover, since the change in hydraulic pressure per unit load is the same both at low pressure (defining low torque capacity) and at high pressure (defining high torque capacity), the hydraulic pressure change arising from hysteresis is large in the low pressure region. Thus scatter arises in the transmitted torque, making it difficult to provide the desired torque with high precision. Therefore, even if feedback control is effected, for example, the deviation or error between the desired value (desired hydraulic pressure) and the controlled variable hydraulic pressure supplied) is large and degrades vehicle riding comfort.

In particular, this problem is encountered when torque capacity has to be increased in response to increasing engine output. Higher torque capacity can be achieved either by expanding the hydraulic clutch pressure control range or by raising the clutch torque capacity, but whichever alternative is selected, the torque capacity control gain inevitably rises relative to solenoid load to exasperate the torque capacity scatter caused by torque load hysteresis.

SUMMARY OF THE INVENTION

An object of this invention is therefore to overcome this drawback of the prior art and to provide a hydraulic pressure-control valve for an internal combustion engine, which is configured in such a manner that the output hydraulic pressure varies in response to a command input according to a first characteristic, while the output hydraulic pressure varies in response to the command input according to a second characteristic when the command input exceeds a predetermined value, wherein the output hydraulic pressure according to the first characteristic per unit of command input is less the output hydraulic pressure according to the second characteristic, thereby reducing load hysteresis and improving control accuracy in a low pressure region, while still enabling a high torque capacity in a high pressure region.

SUMMARY OF THE INVENTION

This invention achieves this object by providing a hydraulic pressure-control valve for controlling a pressure to be supplied to a frictional engaging element in an automatic vehicle transmission, including a hydraulic pressure source; a first pressure-regulating valve connected to the hydraulic pressure source through a first passage to input an input hydraulic pressure from the hydraulic pressure source and connected to the frictional engaging element through a second passage; and valve displacing means for displacing the first-pressure-regulating valve in a first direction such that the first pressure-regulating valve outputs an output hydraulic pressure to the frictional engaging element in response to a command input. The valve comprises a second pressure-regulating valve connected to the first pressure-regulating valve through a third passage to receive the output hydraulic pressure, the first pressure-regulating and the second pressure-regulating valve are connected such that the output hydraulic pressure varies in response to the command input according to a first characteristic, while the output hydraulic pressure varies in response to the command input according to a second characteristic when the command input exceeds a predetermined value, wherein the output hydraulic pressure according to the first characteristic per unit of command input is less than the output hydraulic pressure according the second characteristic.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

Embodiments of the invention will now be explained with reference to the attached drawings.

Figure 1:
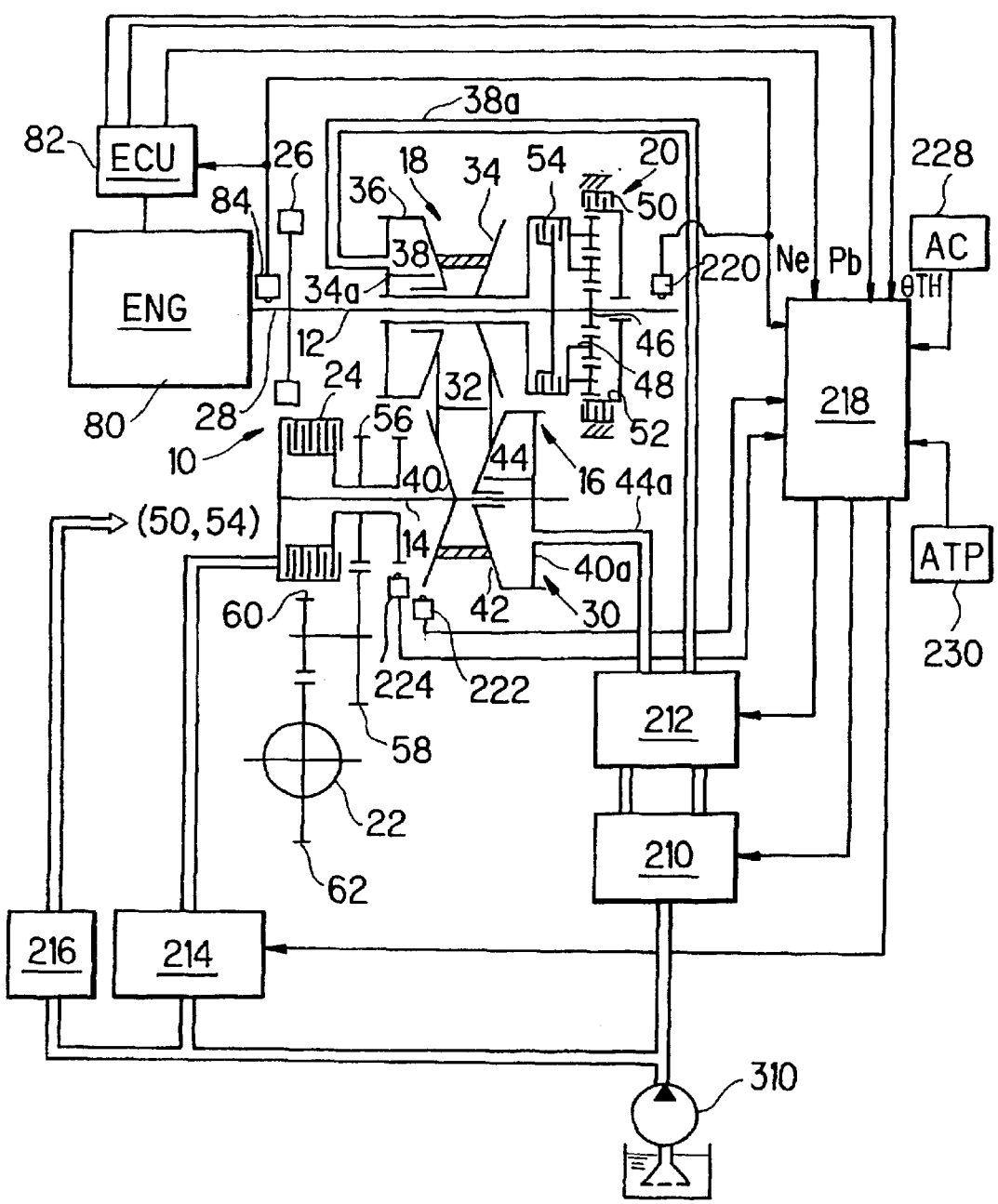
FIG. 1 is a hydraulic circuit schematically showing a hydraulic pressure-control valve for an automatic vehicle transmission, taking a continuously variable transmission having a start clutch as an example.

FIG. 1 is a hydraulic circuit schematically showing a hydraulic pressure-control valve for an automatic vehicle transmission taking a belt-drive continuously variable transmission having a start clutch as an example.

The belt-drive continuously variable transmission and its control system will be explained first.

The belt-drive continuously variable transmission 10 comprises a metal V-belt mechanism 16 located between a transmission input shaft 12 and a counter shaft 14, a planetary gear-type forward/reverse switching mechanism 20 located between the transmission input shaft 12 and a drive-side movable pulley 18, and a start clutch 24 (frictional engagement element) located between the counter shaft 14 and output members including a differential mechanism 22.

The output shaft 28 of an internal combustion engine 80 is connected to the transmission input shaft 12 of the continuously variable transmission 10 through a dual-mass flywheel 26 composed of, inter alia, two flywheels and torsion springs connecting the flywheels (all omitted from the drawing), and power transmitted to the differential mechanism 22 drives left and right wheels (not shown) connected to the differential mechanism 22 through a drive shaft (not shown).

The metal V-belt mechanism 16 comprises the drive-side movable pulley 18 mounted on the transmission input shaft 12, a driven-side movable pulley 30 mounted on the counter shaft 14, and a metal V-belt 32 wound about the two pulleys. The drive-side movable pulley 18 comprises a fixed pulley half 34 mounted on the transmission input shaft 12 and a movable pulley half 36 movable relative to the fixed pulley half 34 in the axial direction.

On the side of the movable pulley half 36 is formed a drive-side cylinder chamber 38 enclosed by a cylinder wall 34a connected to the fixed pulley half 34. Hydraulic pressure supplied to the drive-side cylinder chamber 38 through a hydraulic pressure line (passage) 38a produces lateral pressure for moving the movable pulley half 36 in the axial direction.

The driven-side movable pulley 30 comprises a fixed pulley half 40 mounted on the counter shaft 14 and a movable pulley half 42 movable relative to the fixed pulley half 40 in the axial direction. On the side of the movable pulley half 42 is formed a driven-side cylinder chamber 44 enclosed by a cylinder wall 40a connected to the fired pulley half 40. Hydraulic pressure supplied to the driven-side cylinder 44 through a hydraulic pressure line (passage) 44a produces lateral pressure for moving the movable pulley half 42 in the axial direction.

A group of pressure-regulating valves, generically numbered 210, for determining pulley-control hydraulic pressure supplied to the drive-side cylinder chamber 38 and the driven-side cylinder chamber 44, and a group of speed-ratio control valves, generically numbered 212, is provided for supplying the pulley-control hydraulic pressure to the cylinder chambers 38 and 44. These determine appropriate lateral pulley pressures at which no V-belt 32 slip occurs and vary the width of the pulleys 18, 30 to vary the radius of the V-belt 32 wound about the pulleys 18, 30, thereby continuously varying the speed ratio.

The planetary gear-type forward/reverse switching mechanism 20 comprises a sun gear 46 connected to the transmission input shaft 12, a carrier 48 connected to the fixed pulley half 34, a ring gear 52 that is immobilized by a reverse brake 50, and a forward clutch 54 that connects the sun gear 46 and the carrier 48.

When the forward clutch 54 engages, all gears (sun gear 46, carrier 48 and ring gear 52) rotate unitarily with the transmission input shaft 12 to drive the drive-side movable pulley 18 in the same direction (forward) as the transmission input shaft 12. In the illustrated example having a double pinion planetary gear, engagement of the reverse brake 50 immobilizes the ring gear 52 so that the carrier 48 is driven reversely from the sun gear 46 and the drive-side movable pulley 18 is driven in the opposite direction (reverse) from the transmission input shaft 12.

When both the forward clutch 54 and the reverse brake 50 are disengaged, the transmission of power through the forward/reverse switching mechanism 20 is cut off and no power is transmitted between the engine 80 and the drive-side movable pulley 18.

The start clutch 24 is for ON/OFF (engage/disengage) control of power transmission between the counter shaft 14 and the output members including the differential mechanism 22. When it is ON (engaged), power can be transmitted between the two. Therefore, when the start clutch 24 is ON, the engine output varied in speed ratio by the metal V-belt mechanism 16 is transmitted through the gears 56, 58, 60 and 62 to the differential mechanism 22, which distributes it to the left and right driven wheels.

When the start clutch 24 is OFF (disengaged), this power transmission is not effected and the transmission assumes a neutral state. The operation of the start clutch 24 is controlled by a pressure-control valve (specifically, a clutch control valve) 214, and the operation of the reverse brake 50 and the forward clutch 54 of the forward/reverse switching mechanism 20 is controlled by a manual shift valve 216 in response to the operation of a manual shift lever (not shown) manually operated by the vehicle driver.

More specifically, these valves are controlled in response to command signals sent from a controller 218 comprised of a microcomputer.

For this, an engine speed sensor 84 is provided at an appropriate location such as in the vicinity of the output shaft 28 of the engine 80 for generating a signal indicative of the engine speed Ne while, a speed sensor 220 is provided in the vicinity of the transmission input shaft 12 for generating a signal indicative of its rotational speed Ndr, a speed sensor 222 is provided in the vicinity of the driven-side movable pulley 30 for generating a signal indicative of its rotational speed, i.e., the rotational speed Ndn of the input shaft of the start clutch 24, and a speed sensor 224 is provided in the vicinity of the gear 56 for generating a signal indicative of its rotational speed, i.e., the rotational speed Nout of the output shaft of the start clutch 24.

All of these speed sensors are electromagnetic pickups which send the signals to the controller 218. The controller 218 is connected with another controller (illustrated as "ECU" in the figure) 82 which controls the operation of the engine 80 and inputs engine operating parameters including manifold absolute pressure Pb and throttle opening $\theta$TH from the ECU 82.

Furthermore, an air-conditioner switch 228 (illustrated as "AC") is provided for generating an ON signal when an air conditioner (not shown) is in operation, and a selector switch 230 (illustrated as "ATP") which generates a signal indicative of a shift range position (D, N, P, . . . ; corresponding to the spool position of the manual shift valve 216) selected through the manual shift lever by the vehicle driver. These signals are also sent to the controller 218.

Figure 2:
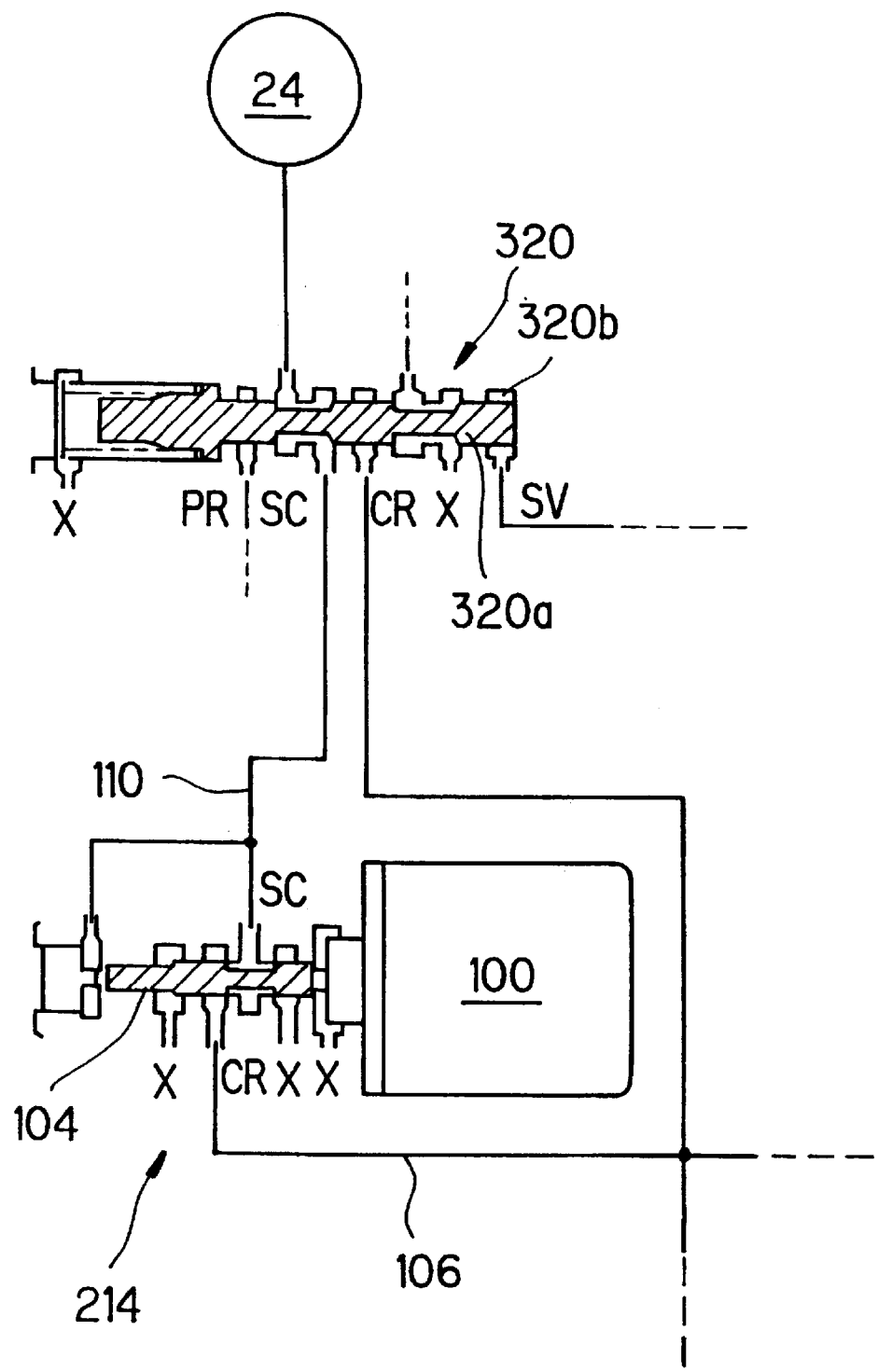
FIG. 2 is a hydraulic circuit diagram showing the hydraulic pressure-control valve (specifically, a clutch control valve) for controlling the pressure of a start clutch illustrated in FIG. 1.

The clutch control valve (hydraulic pressure-control valve) 214 which controls the operation of the start clutch 24 will be explained with reference to FIG. 2.

Oil delivered by a hydraulic pump 310 (shown in FIG. 1) is passed through a high-pressure-regulating valve (not shown), which regulates it to a prescribed high pulley-control pressure, and through a pressure-reducing valve (not shown), which regulates it to a substantially constant hydraulic pressure (clutch-reducing pressure CR; the line-pressure), and is then supplied to the clutch control valve 214 through the line-pressure supply line (passage) 106.

The clutch control valve 214 is equipped with an electromagnetic linear solenoid 100. The clutch-control-pressure SC (to be supplied to the clutch) is regulated by the current passed through the linear solenoid 100 (the solenoid load) and supplied to a shift-inhibitor valve 320.

Since the gist of the invention resides in this clutch control valve 214, this will be explained in detail later.

When the spool 320a of the shift-inhibitor valve 320 is on the right, the clutch-control-pressure SC from the output line (passage) 110 is supplied to the start clutch 24. At this time, the start clutch 24 is controlled to engage based on the clutch-control-pressure SC produced by the clutch control valve 214.

Figure 4:
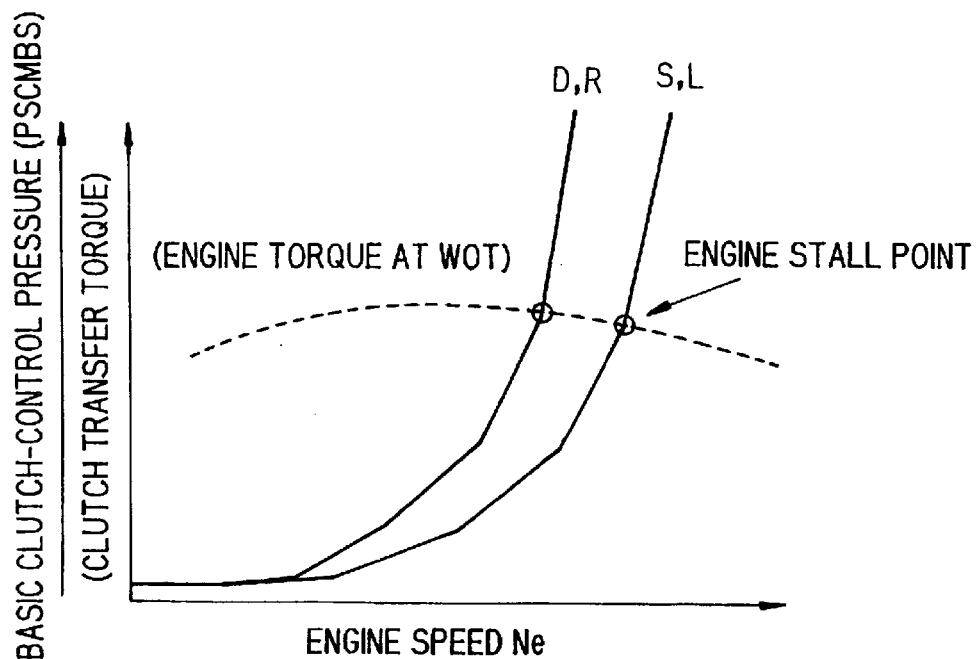
FIG. 4 is a graph showing the characteristics of mapped data defining a basic value of the desired clutch-control pressure illustrated in FIG. 3.
Figure 5:
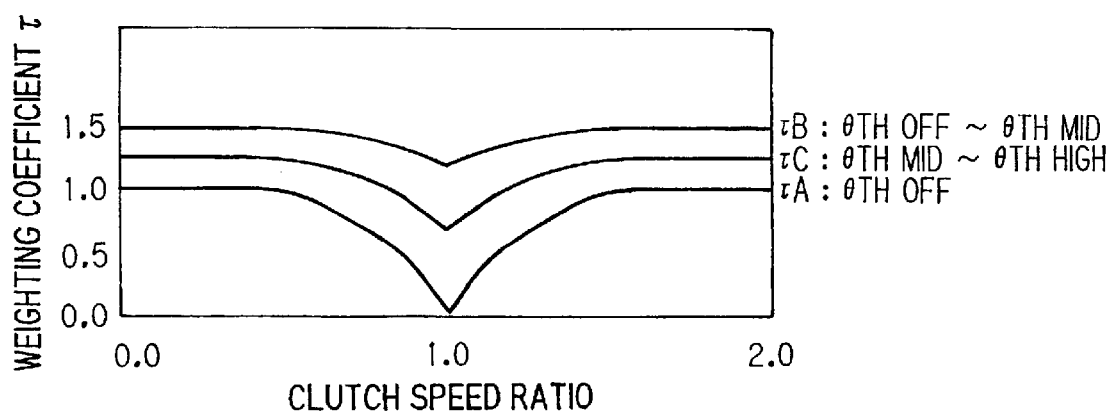
FIG. 5 is a graph showing the characteristics of mapped data defining a weighting coefficient τ to be multiplied to the basic value to determine the desired clutch-control pressure.

The determination of the desired clutch-control pressure (to be supplied to the start clutch 24) will be explained with reference to FIGS. 3 to 5. This is effected by the controller 218.

Figure 3:
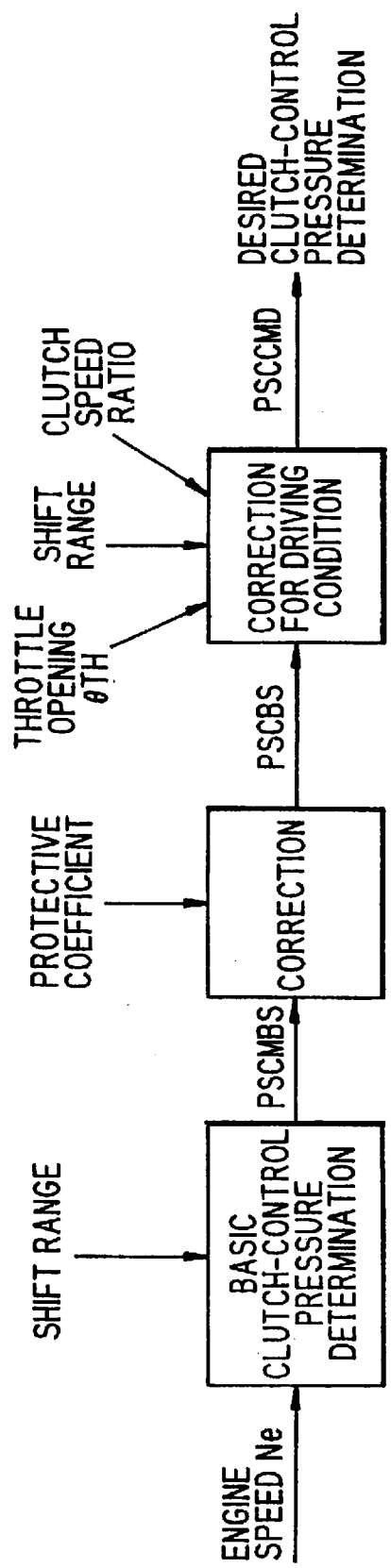
FIG. 3 is a block diagram showing the determination of a desired clutch-control pressure of the hydraulic pressure-control valve illustrated in FIG. 2.

As shown by the block diagram of FIG. 3, the controller first determines a basic value of the clutch-control-pressure (determining the clutch transfer torque) PSCMBS by retrieval from mapped data using the engine speed-Ne and the selected shift range as address data. The characteristics of this mapped data are shown in FIG. 4. It then multiplies the determined basic clutch-control-pressure by a protective coefficient calculated from the temperature of the hydraulic fluid (oil) to obtain a corrected clutch-control-pressure (PSCBS). This correction is for protecting the start clutch from damage owing to hydraulic fluid temperature fluctuation.

Next, it effects correction for the driving conditions. Specifically, it uses the throttle opening $\theta$TH to select one from among three weighting coefficients τA, τB, τC and retrieves a weighting coefficient τ from mapped data (whose characteristics are shown in FIG. 5) using the clutch speed ratio (calculated by dividing the output shaft speed Nout of the start clutch 24 by the input shaft speed Ndn thereof) as address datum, and using the retrieved weighting coefficient τ and the shift range position to effect another correction on the corrected clutch-control-pressure to determine the desired clutch-control-pressure PSCCMD. The start clutch 24 is controlled such that the desired clutch-control-pressure determined in this manner is achieved.

The clutch control valve (hydraulic pressure-regulating valve) 214, will now be explained in detail with reference to FIG. 6. In the following explanation, members like those of the conventional system are assigned the same reference symbols as those of the conventional valve.

In its general configuration, the clutch control valve 214 is equipped with an additional output pressure feedback circuit which is provided with a second pressure-regulating valve (hereinafter "sub-valve") 114 disposed in series with the pressure-regulating valve 104 (first pressure-regulating valve).

The load of the sub-valve 114 (the product of the area of the pressure receiving surface of the sub-valve 114 and the feedback hydraulic pressure acting thereon) is transmitted to the pressure-regulating valve 104 through the spring 102. This establishes a first pressure characteristic. When the spring 102 contracts by more than a certain length and the sub-valve 114 strikes on a land (abutment surface) 108a of the valve body 108, the first pressure characteristic changes to a second pressure characteristic.

More specifically, the sub-valve 114 is provided to be movable within the valve body 108 in series with the pressure-regulating valve 104 with the spring 102 clamped therebetween. The output pressure SC acts on the rear end of the sub-valve 114 through a second feedback line (passage, the additional output pressure feedback circuit) 112a. When the solenoid 100 (the electromagnetic linear solenoid whose output is proportional to the electric current passing therethrough; valve displacing means) is energized, the pressure-regulating valve 104 is pushed to the right in the drawing by the plunger 100a of the solenoid 100.

Since the load acting on the sub-valve 114 is transmitted to the pressure-regulating valve 104 through the spring 102, the characteristic (the first characteristic) of clutch-control pressure supplied to the start clutch 24 at this time is;

$$SC=(FSOL-FSPG1)/(A1+A2)$$

where SC: clutch-control pressure to be supplied to the start clutch, FSOL: solenoid load, FSPG1: initial spring load, A1: pressure-regulating valve feedback pressure receiving area, and A2: sub-valve feedback pressure receiving area.

Until the sub-valve 114 strikes on the land 108a of the valve body 108, the output pressure SC can be supplied to the clutch hydraulic chamber via the shift-inhibitor valve 320 through the output line (passage) 110 in response to increase of the solenoid load to obtain clutch-control pressure defined by the foregoing equation. The feedback pressure receiving-area is the sum of the pressure receiving areas of the pressure regulation valve 104 and the sub-valve 114.

Then, when the spring 102 has been contracted by the load acting on the sub-valve 114 to the point that the sub-valve 114 strikes on the land 108a, all of the increase in sub-valve load with increasing hydraulic pressure is thereafter borne by the valve body 108. The spring load does not increase further and the result is equivalent to that of a decrease in the feedback pressure receiving area. The amount of change in hydraulic pressure with rise in current (solenoid load) therefore increases.

The characteristic (the second characteristic) of clutch control pressure supplied to the start clutch at this time is;

$$SC=(FSOL-FSPG2)/A1$$

where FSPG2: spring load when sub-valve strikes land.

Based on the above, the hydraulic pressure-control valve (clutch control valve 214) for controlling a pressure to be supplied to a frictional engaging element (start clutch 24) in an automatic vehicle transmission is configured such that it includes a hydraulic pressure source (hydraulic pump 310), a first pressure-regulating valve (104) connected to the hydraulic pressure source through a first passage (106) to input an input hydraulic pressure (CR) from the hydraulic pressure source and connected to the frictional engaging element through a second passage (110), and valve displacing means (electromagnetic solenoid 100) for displacing the first-pressure regulating valve in a first direction such that the first pressure-regulating valve outputs an output hydraulic pressure (SC) to the frictional engaging element in response to a command input, wherein the improvement comprises a second pressure-regulating valve (sub-valve 114) connected to the first pressure-regulating valve through a third passage (112a, 112c) to receive the output hydraulic pressure (SC), the first pressure-regulating and the second pressure-regulating valve is connected such that the output hydraulic pressure (SC) varies in response to the command input according to a first characteristic (SC1), while the output hydraulic pressure (SC) varies in response to the command input according to a second characteristic (SC2) when the command input exceeds a predetermined value (1.0 [A], clutch pressure of 6.0 [kgf/cm$^2$]), wherein the output hydraulic pressure according to the first characteristic per unit of command input is less than the output hydraulic pressure according the second characteristic.

Figure 7:
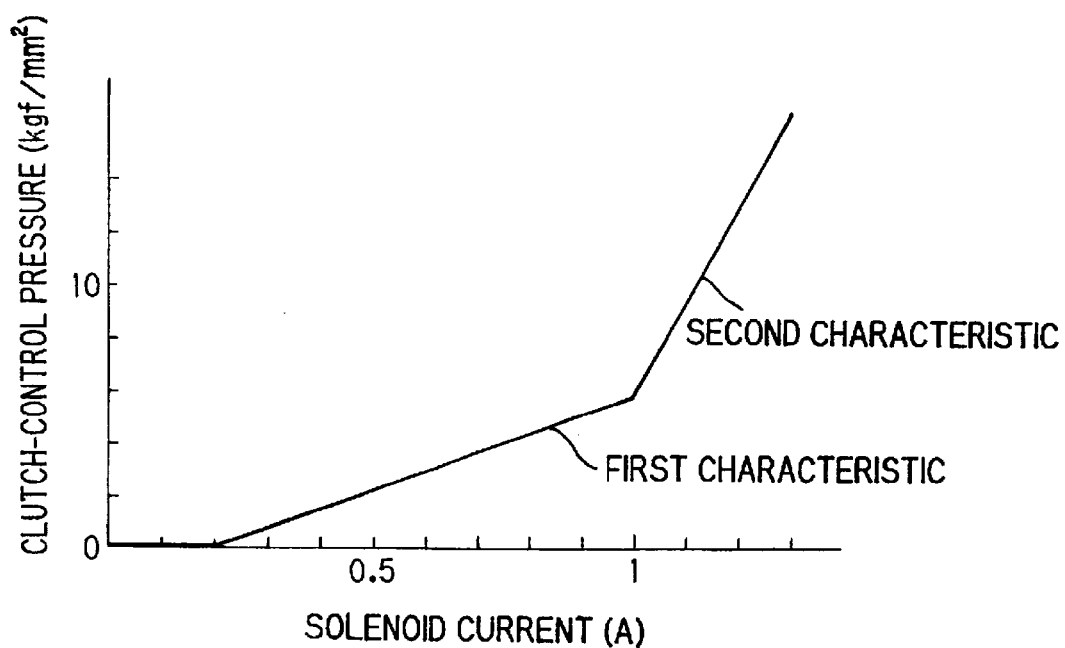
FIG. 7 is a graph showing the characteristics of hydraulic pressure output from the hydraulic pressure-control valve illustrated in FIG. 6.

With this configuration, the characteristic of clutch-control pressure with respect to solenoid 100 current (solenoid load) can be changed. Specifically, as shown in FIG. 7, the first characteristic defining a relatively small change in clutch control pressure with change in solenoid current (solenoid load) is established up to a prescribed point (time point of abutment of sub-valve on land; more specifically, until the current becomes 1.0 [A] or the clutch control pressure becomes 6.0 [kgf/cm$^2$], whereafter the first characteristic changes to the second characteristic defining larger change in clutch control pressure with respect to current.

Figure 8:
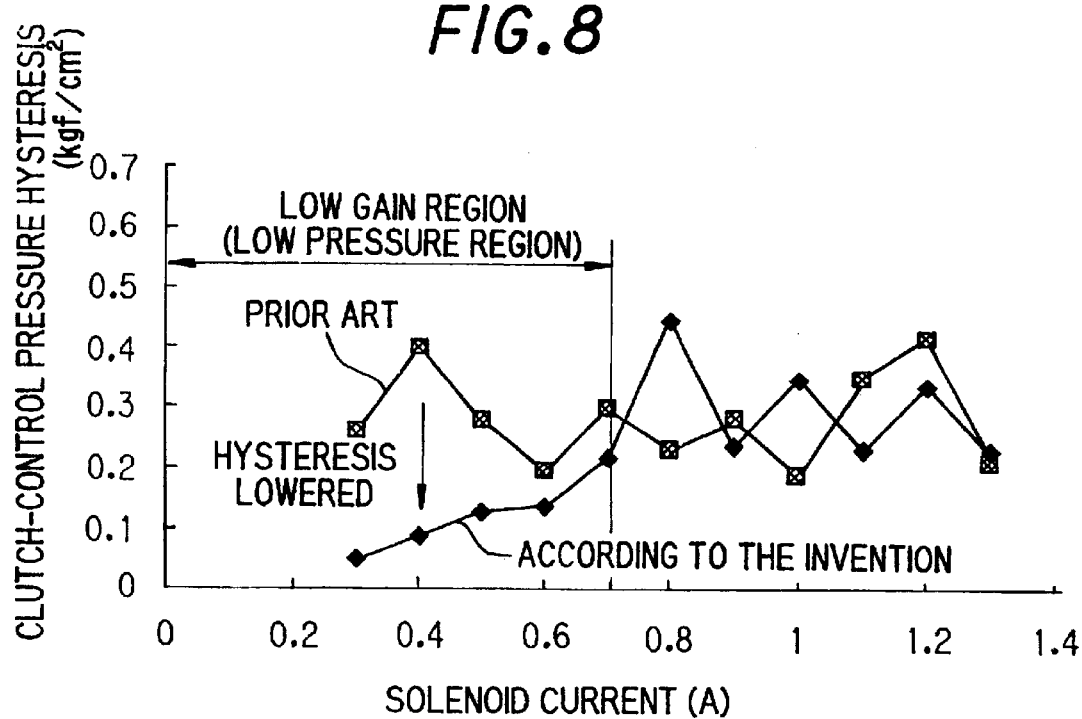
FIG. 8 is a graph showing hysteresis of hydraulic pressure output from the hydraulic pressure-control valve illustrated in FIG. 6 in contrast with a prior art hydraulic pressure control valve.
Figure 24:
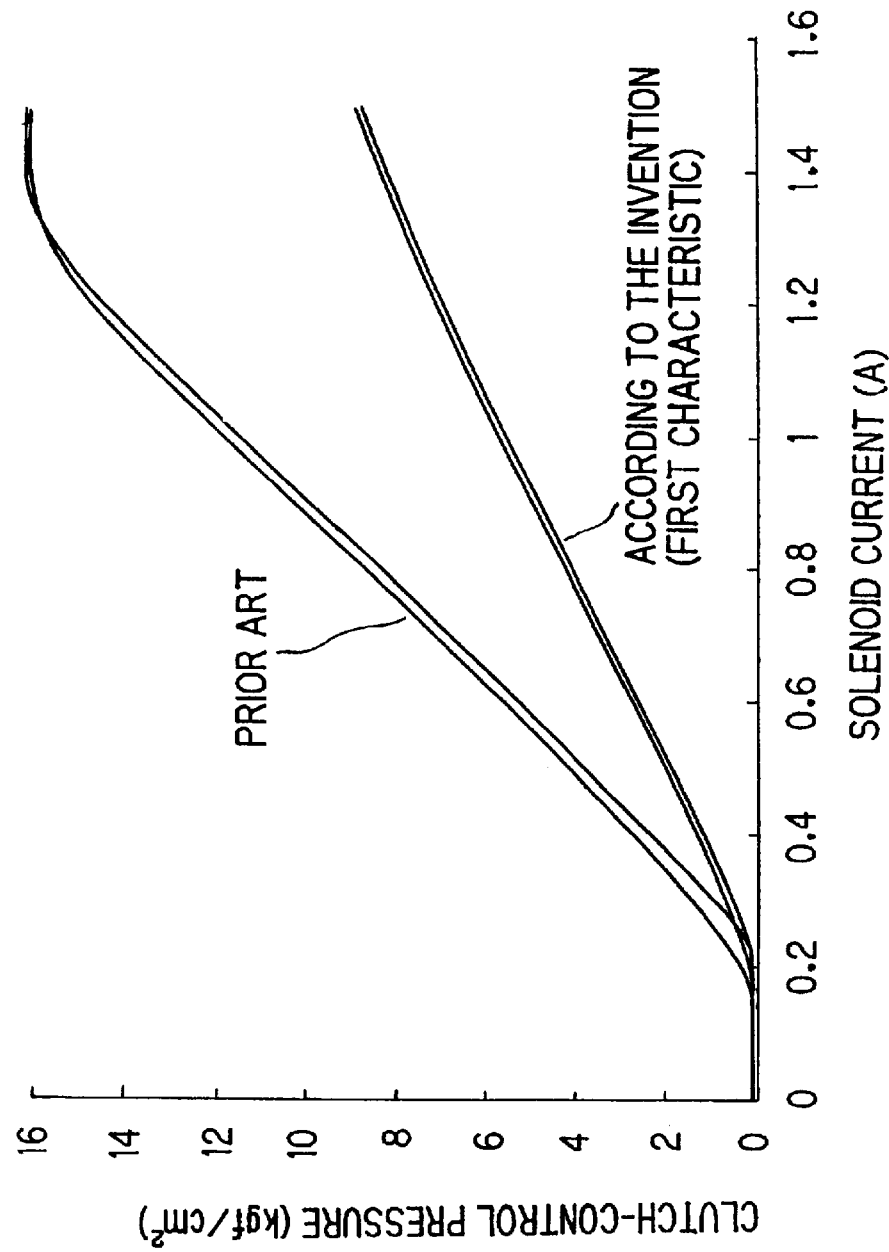
FIG. 24 is test data showing the characteristic of hydraulic pressure output from the prior art hydraulic pressure-control valve illustrated in FIG. 21 in contrast with the hydraulic pressure-control valve according to the invention illustrated in FIG. 6.

Therefore, in the low pressure (low torque) region, the hysteresis can be made small to make the change in hydraulic pressure (torque) with unit load hysteresis small. This is shown by the curves marked "ACCORDING TO THE INVENTION" in FIGS. 8 and 24. Even when torque capacity control gain is increased relative to solenoid load, no increase arises in torque capacity scatter caused by solenoid load hysteresis.

Hence, no scatter arises in the obtained torque capacity, desired torque capacity can be imparted with high precision, and control accuracy can be improved. As a result, deviation or error between the desired value (desired clutch control pressure) and the controlled variable (clutch control pressure supplied) can be reduced also when effecting feedback control. On the other hand, since change in clutch control pressure per unit change in current is made large in the high pressure (high torque) region, the same torque capacity as in the prior art can be secured. Thus, it becomes possible, to optimally balance the control response in the low torque region and securement of torque capacity in the high torque region.

Figure 9:
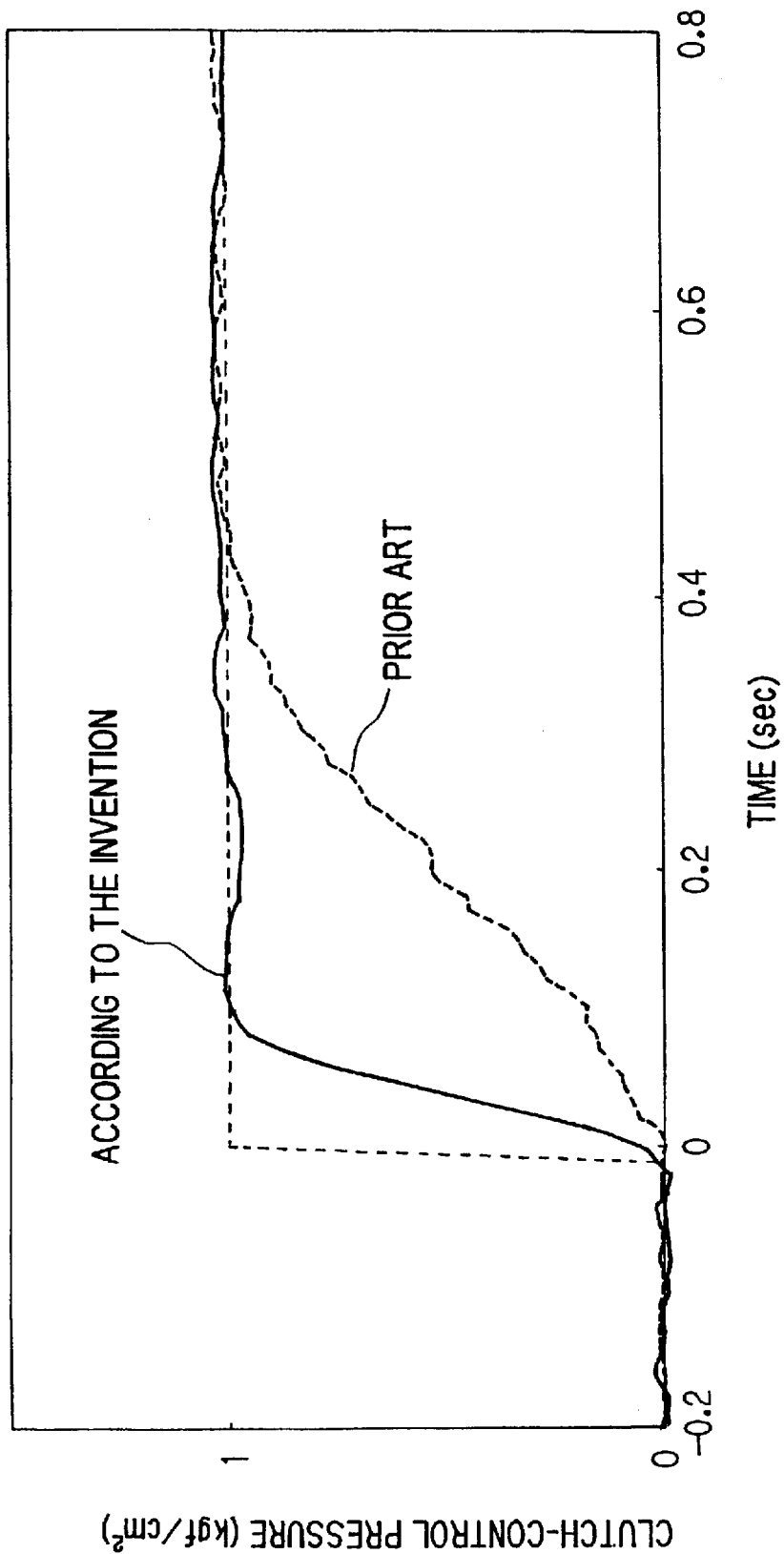
FIG. 9 is test data showing a step response in the hydraulic pressure to the hydraulic pressure-control valve illustrated in FIG. 6 in contrast with the response to the prior art hydraulic pressure-control valve.
Figure 22:
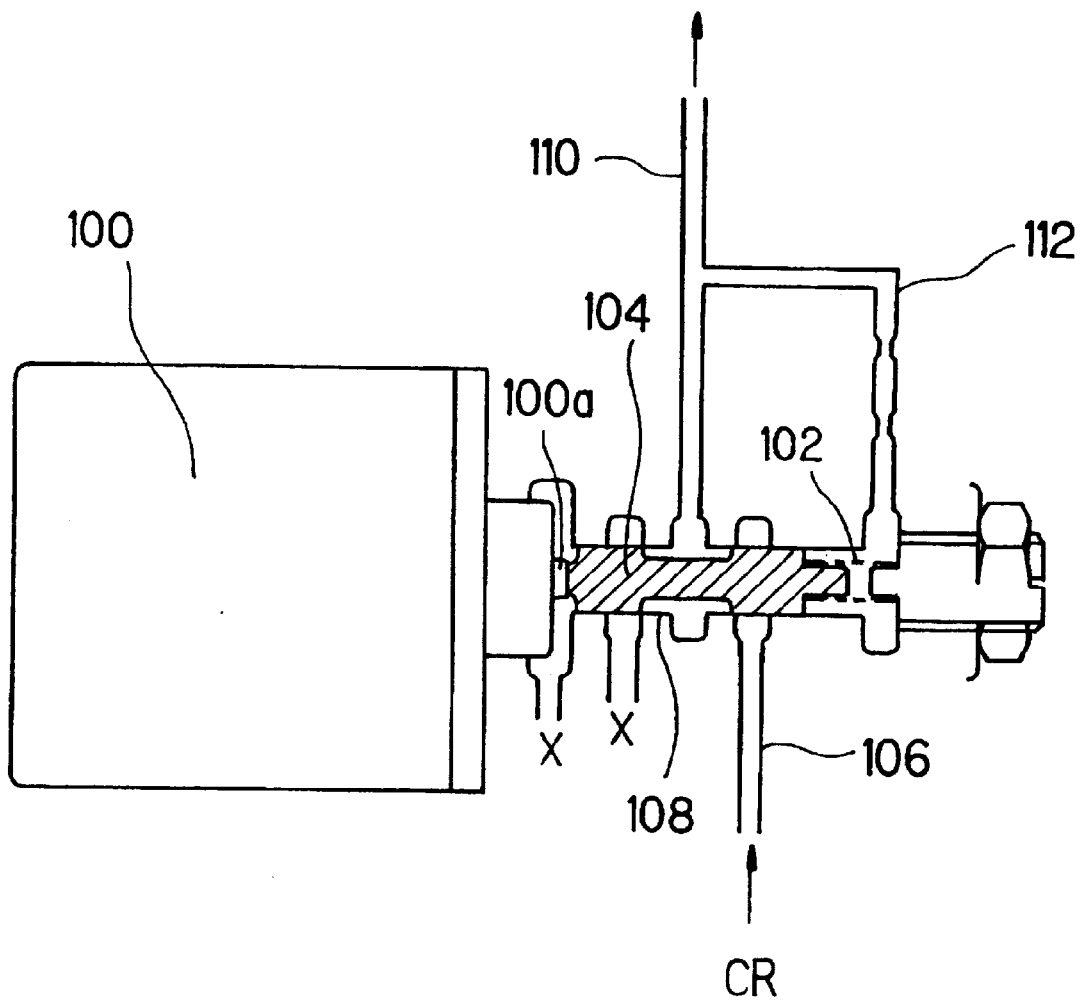
FIG. 22 is a hydraulic circuit diagram showing a prior-art hydraulic pressure-control valve for an automatic vehicle transmission.
Figure 23:
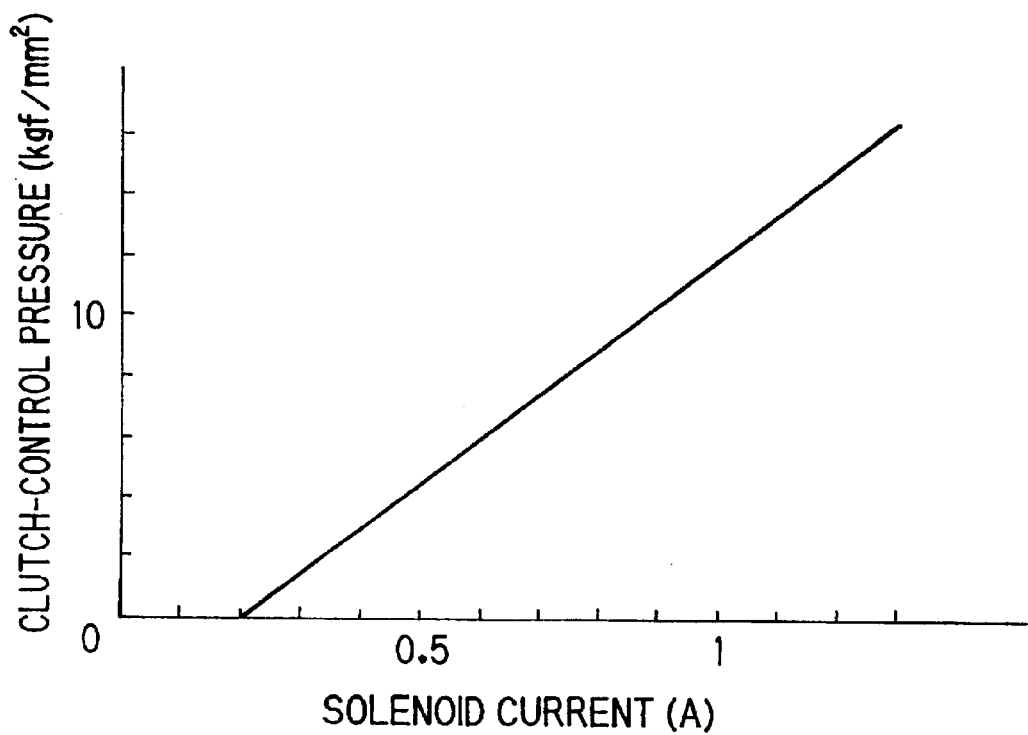
FIG. 23 is a graph showing the characteristics of hydraulic pressure output from the prior art hydraulic pressure-control valve illustrated in FIG. 21.

FIG. 9 shows response curves plotted using measured data obtained for the clutch control valve 214 according to the invention and the conventional clutch control valve mentioned earlier with reference to FIG. 22. In the case of the valve according to the invention, the control response is improved in the low pressure region. In the high pressure region, on the contrary, since a unit command input will change pressure by a larger amount, it becomes possible to secure the same torque capacity as in the prior art valve.

Figure 25:
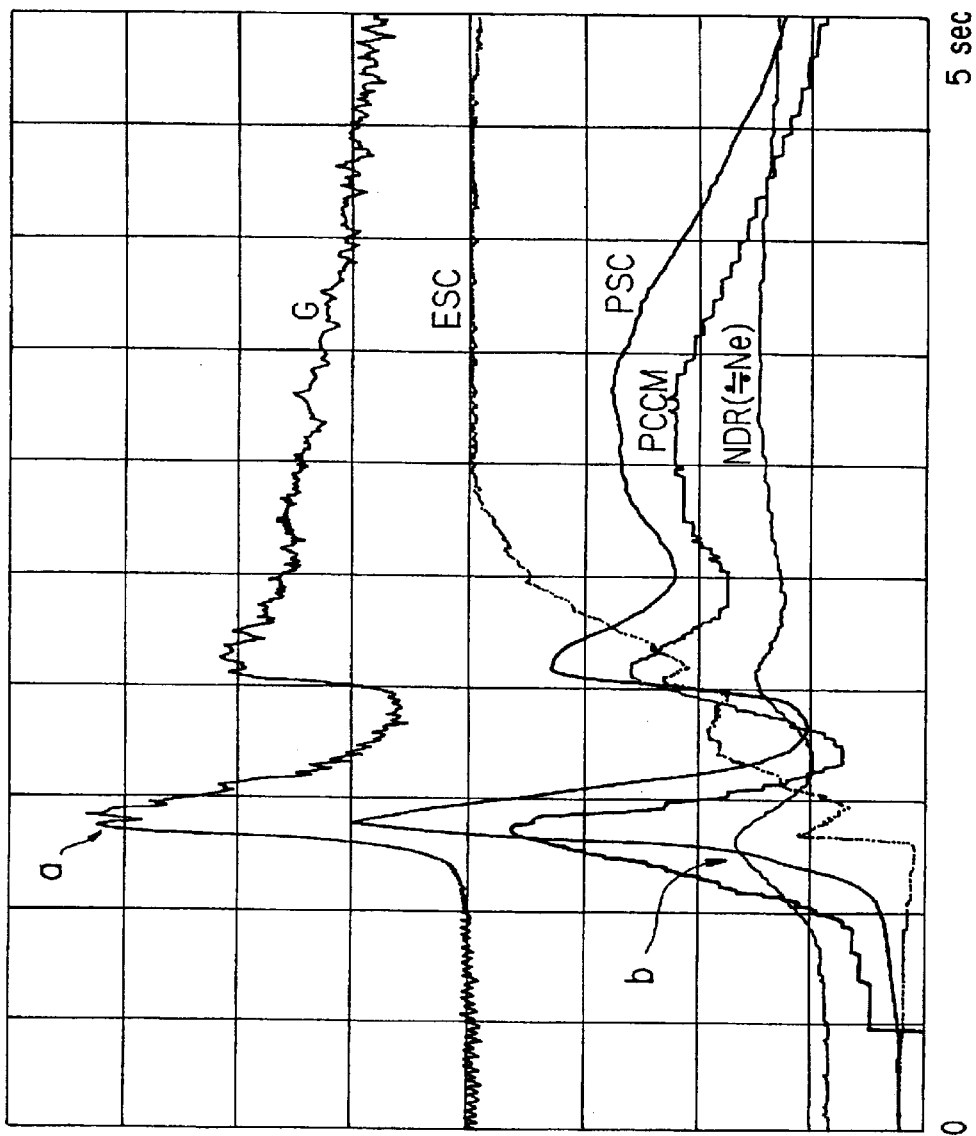
FIG. 25 is a view, similar to FIG. 10, but illustrating test data showing the start clutch control using the prior art hydraulic pressure-control valve illustrated in FIG. 22.

The curves in FIG. 25 were plotted using data obtained in a test (simulation) using the conventional clutch control valve. As can be seen, the actual clutch control pressure was sometimes higher than the desired clutch-control pressure. As indicated by a in the graph, a sharp rise in the acceleration G in the direction of vehicle travel produced a shock, giving the passengers an unpleasant sensation. As shown at b on the engine speed Ne curve, moreover, engine revving occurred due to the supply of actual clutch-control pressure differing from the desired clutch-control pressure.

Figure 10:
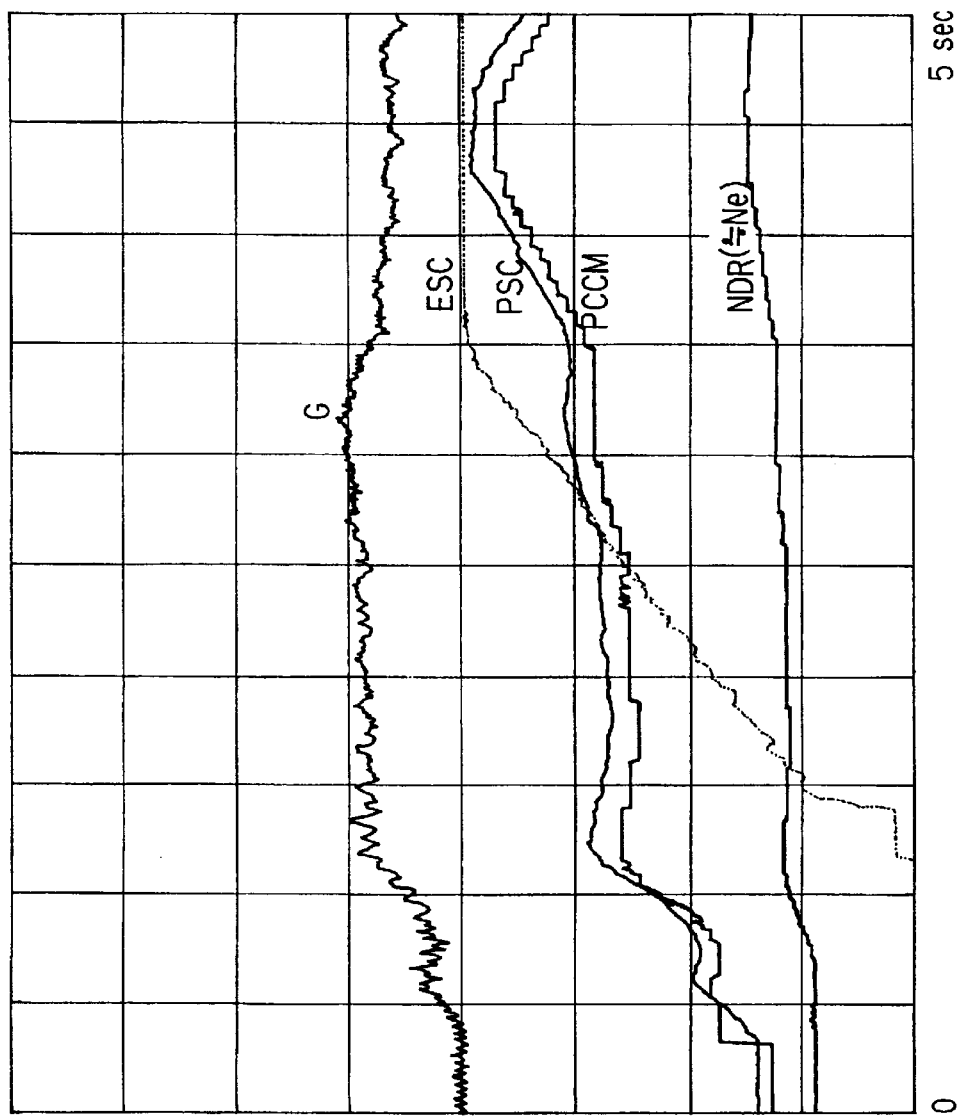
FIG. 10 is a test data showing the start clutch control using the hydraulic pressure-control valve illustrated in FIG. 6.

The curves in FIG. 10 were plotted using data obtained when clutch pressure control was effected using the clutch control valve 214 according to the invention. These curves, which correspond to those in FIG. 25, show that the actual clutch-control pressure was kept substantially closer to being equal to the desired clutch-control pressure and that no shock occurred owing to sudden change in acceleration G. As can be noted from the engine speed Ne curve, moreover, thanks to the improvement in control response over the prior art seen in FIG. 9, the engine revving encountered with the conventional clutch control was also eliminated.

In the hydraulic pressure-control valve according to this embodiment, change in clutch pressure per unit solenoid current in the first characteristic in the low pressure region is reduced to ½ of that in the second characteristic in the high pressure region. As a result, this valve can achieve the fine torque capacity control in the low pressure region described in the foregoing. Moreover, even when torque capacity control gain is increased relative to solenoid load, no increase arises in torque (controlled variable) scatter caused by solenoid load hysteresis.

It therefore becomes possible to impart clutch-control pressure with good accuracy so as to achieve stable vehicle starting when utilizing this in vehicle starting (creep) control and the like. On the other hand, since change in clutch pressure per unit change in current is larger in the high pressure region than in the low pressure region, the same torque capacity as in the prior art can be secured.

Figure 6:
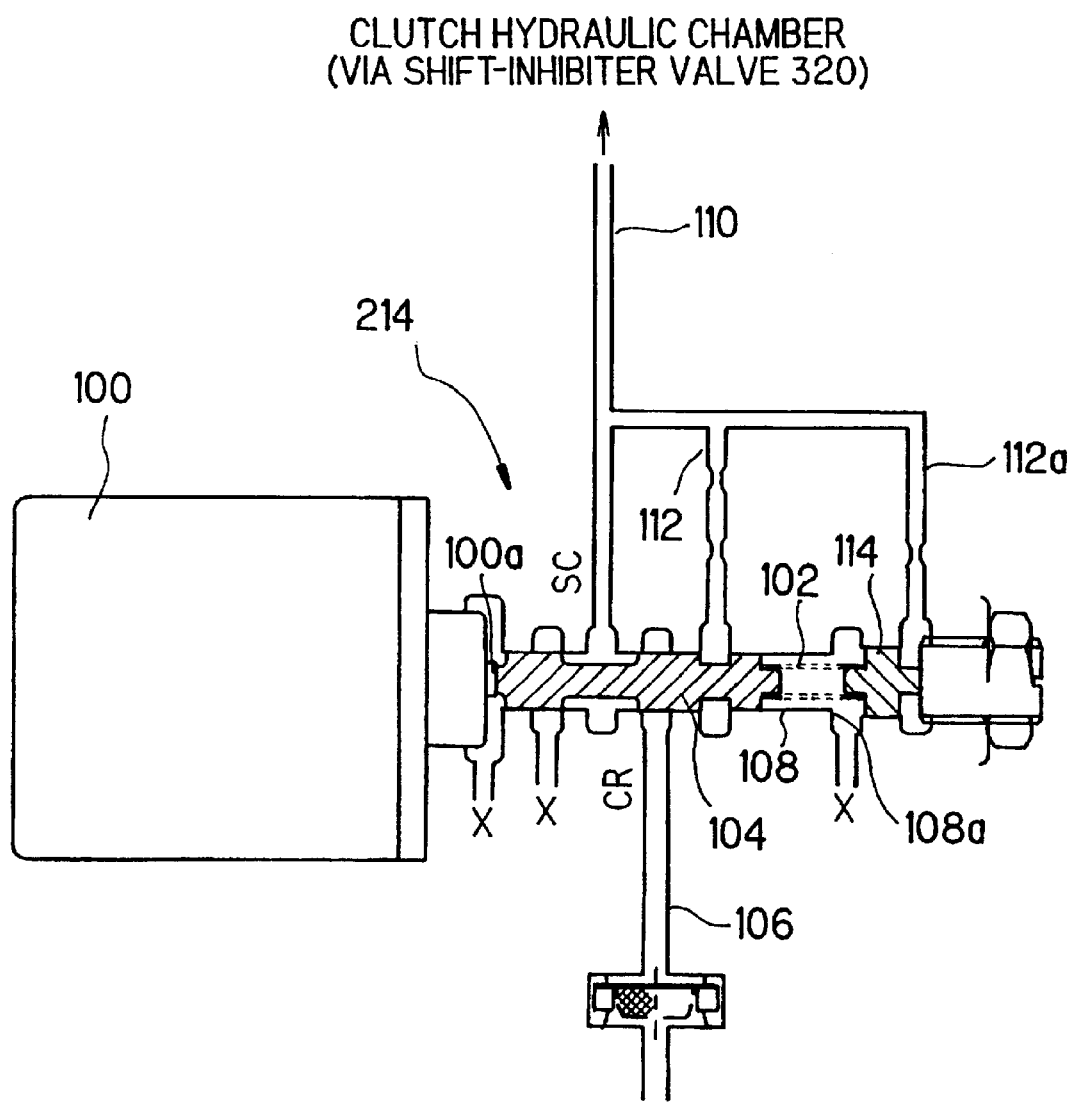
FIG. 6 is a hydraulic circuit diagram showing the hydraulic pressure-control valve (illustrated in FIG. 2) for an automatic vehicle transmission according to the present invention.
Figure 11:
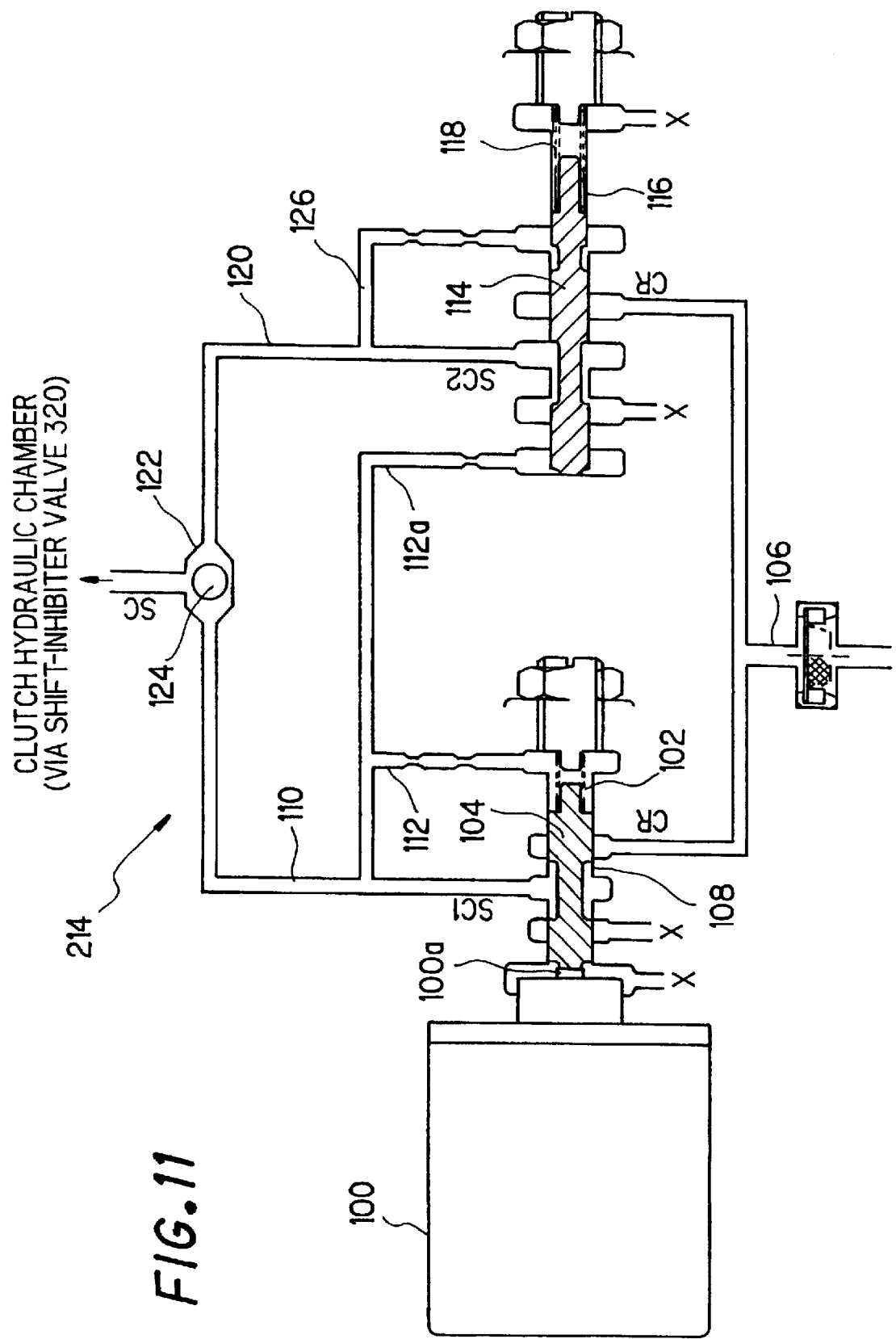
FIG. 11 is a view, similar to FIG. 6, but showing a hydraulic pressure-control valve for an automatic vehicle transmission according to a second embodiment of the invention.

FIG. 11 is a hydraulic circuit diagram similar to FIG. 6, but showing a hydraulic pressure-control valve, specifically the clutch control valve 214 according to a second embodiment of the invention. In the following explanation of the second embodiment, members like those of the first embodiment are assigned the same reference symbols as those of the first embodiment.

In the clutch control valve 214 according to the second embodiment, a second valve body 116 is provided in parallel with the pressure-regulating valve 104 and the sub-valve 114 (elongated compared to the first embodiment) is movably housed therein. The sub-valve 114 in the second valve body 116 is biased by a second spring 118 in the direction of closing the line-pressure supply line 106 and an output line 120, i.e., to the left in the drawing.

The output pressure SC1 of the pressure-regulating valve 104 acts on the other end of the pressure-regulating valve 104 through the feedback line 112 and, together with the force of the spring 102, presses the pressure-regulating valve 104 to the left in the drawing. The output pressure SC1 of the pressure-regulating valve 104 further acts on the sub-valve 114 through a second feedback line 112a to press the sub-valve 114 to the right in the drawing against the force of the second spring 118.

The sub-valve 114 is connected to the line-pressure supply line 106. The output line 120 thereof joins the output line 110 of the pressure-regulating valve 104 at a confluence point 122 and is from there connected with the clutch hydraulic chamber via the shift-inhibitor valve 320. A movable ball 124 is provided at the confluence point 122.

The output pressure SC2 of the sub-valve 114 is fed back to the sub-valve 114 through a third feedback line 126 to press the sub-valve 114 to the left in cooperation with the spring 118.

The operation of the clutch control valve 214 according to the second embodiment will now be explained.

The pressure-regulating valve 104 is pressed to the right in the drawing in proportion to the current passing through the solenoid 100. Upon moving a distance corresponding to a current of 0.2 [A], it communicates the line-pressure supply line 106 and the output line 110. The output pressure SC1 produced in the output line 110 as a result is supplied through the confluence point 122 to the clutch hydraulic chamber via the shift-inhibitor valve 320 as the clutch-control pressure SC.

Figure 12:
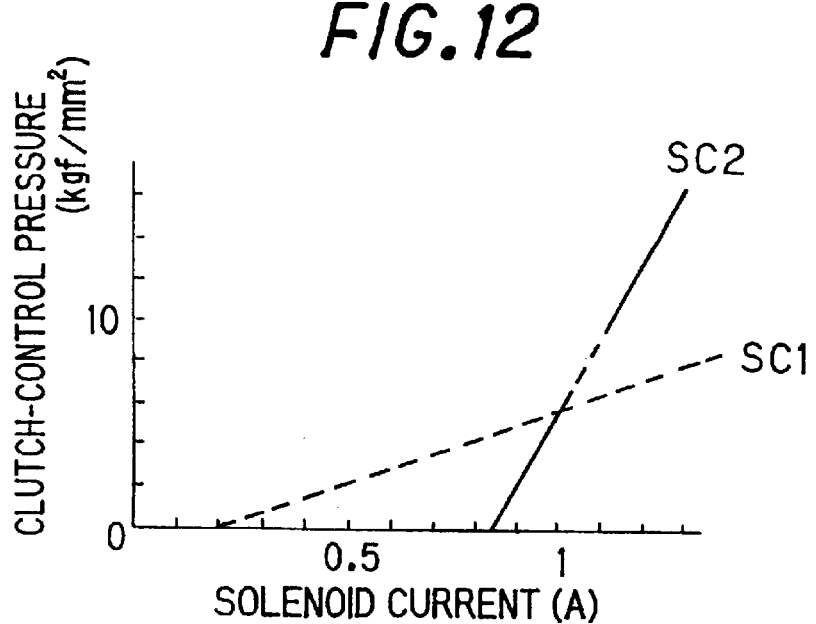
FIG. 12 is a graph showing the hydraulic pressure outputs from the hydraulic pressure-control valve illustrated in FIG. 11.

The characteristic of the output pressure SC1 of the pressure-regulating valve 104 is shown by the dashed curve in FIG. 12. This corresponds to the first characteristic mentioned earlier.

At this time, the ball 124 provided at the confluence point 122 is pressed to the right in the drawing and closes the output line 120 of the sub-valve 114. The flow rate of oil to the clutch thereafter increases in proportion to the current through the solenoid 100, and the clutch pressure increases with clutch load.

On the other hand, the output pressure SC1 of the pressure-regulating valve 104 is also applied to the sub-valve 114 through the feedback line 112a to press the sub-valve 114 to the right in the drawing against the force of the spring 118. Upon moving a prescribed distance, the sub-valve 114 communicates the line-pressure supply line 106 and the output line 120 to output the output pressure SC2 on the output line 120.

The output pressure SC2 restores the ball 124 to the center of the confluence point 122, merges with the output pressure SC1 of the pressure regulation valve 104, and is supplied to the clutch hydraulic chamber as the clutch-control pressure SC. The characteristic of the output pressure SC2 of the sub-valve 114 is shown by the two-dot chain curve in FIG. 12.

Figure 13:
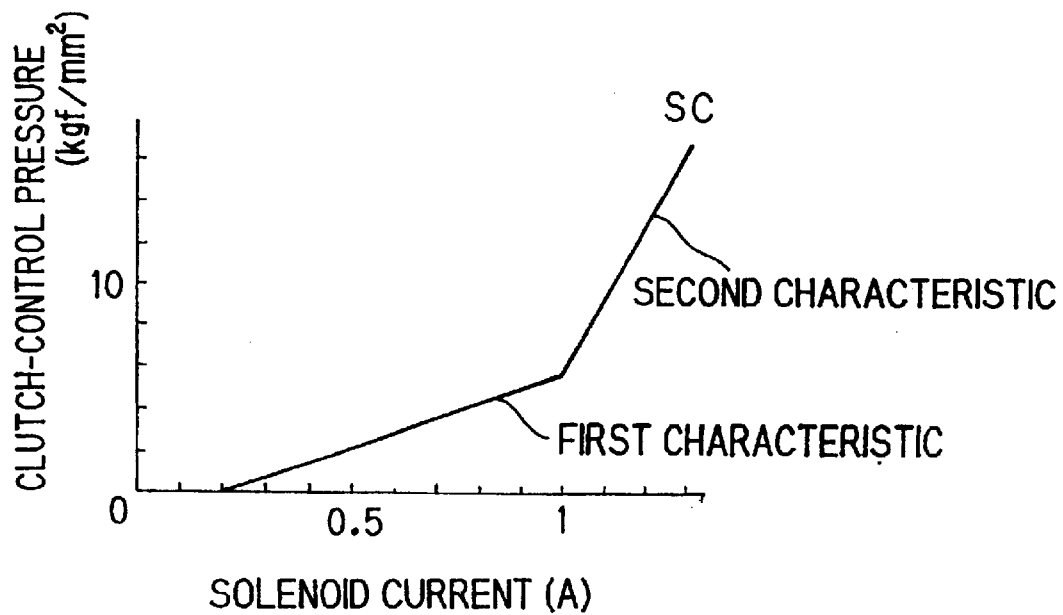
FIG. 13 is a graph showing the characteristics of hydraulic pressure output from the hydraulic pressure-control valve illustrated in FIG. 6 obtained by combining the hydraulic pressures illustrated in FIG. 11.

In the clutch control valve 214 according to the second embodiment, when the sub-valve 114 communicates, the pressure-regulating valve output pressure SC1 and the sub-valve output pressure SC2 merge and are supplied to the clutch as the clutch pressure SC. In other words, as shown in FIG. 13, the oil pressure supply characteristic becomes what is obtained by combining the pressure-regulating valve output characteristic (first characteristic) and the sub-valve output characteristic (second characteristic).

The characteristic of the pressure-regulating valve output pressure SC1 (first characteristic) is set to define smaller change in clutch pressure per unit solenoid current than the characteristic of the sub-valve output pressure SC2 (second characteristic). As in the first embodiment, the first characteristic changes to the second characteristic in the vicinity of a current of 1.0 [A] (clutch pressure of 6.0 [kgf/cm$^2$]).

Owing to the aforesaid configuration, the second embodiment of the clutch control valve 214 can, like the first embodiment, reduces change in hysteresis per unit load pressure (torque) in the low pressure (torque) region. Moreover, even when torque capacity control gain is increased relative to solenoid load, no increase arises in torque scatter caused by solenoid load hysteresis.

Hence, no scatter arises in the obtained torque capacity, desired torque capacity can be imparted with high precision, and control accuracy can be improved. Moreover, since a command input achieves a larger pressure change in the high pressure region, the control response is good. In other words, since pressure change per unit change in current is made large in the high pressure (high torque) region, the control response is improved and the same torque capacity as in the prior art can be secured.

Figure 14:
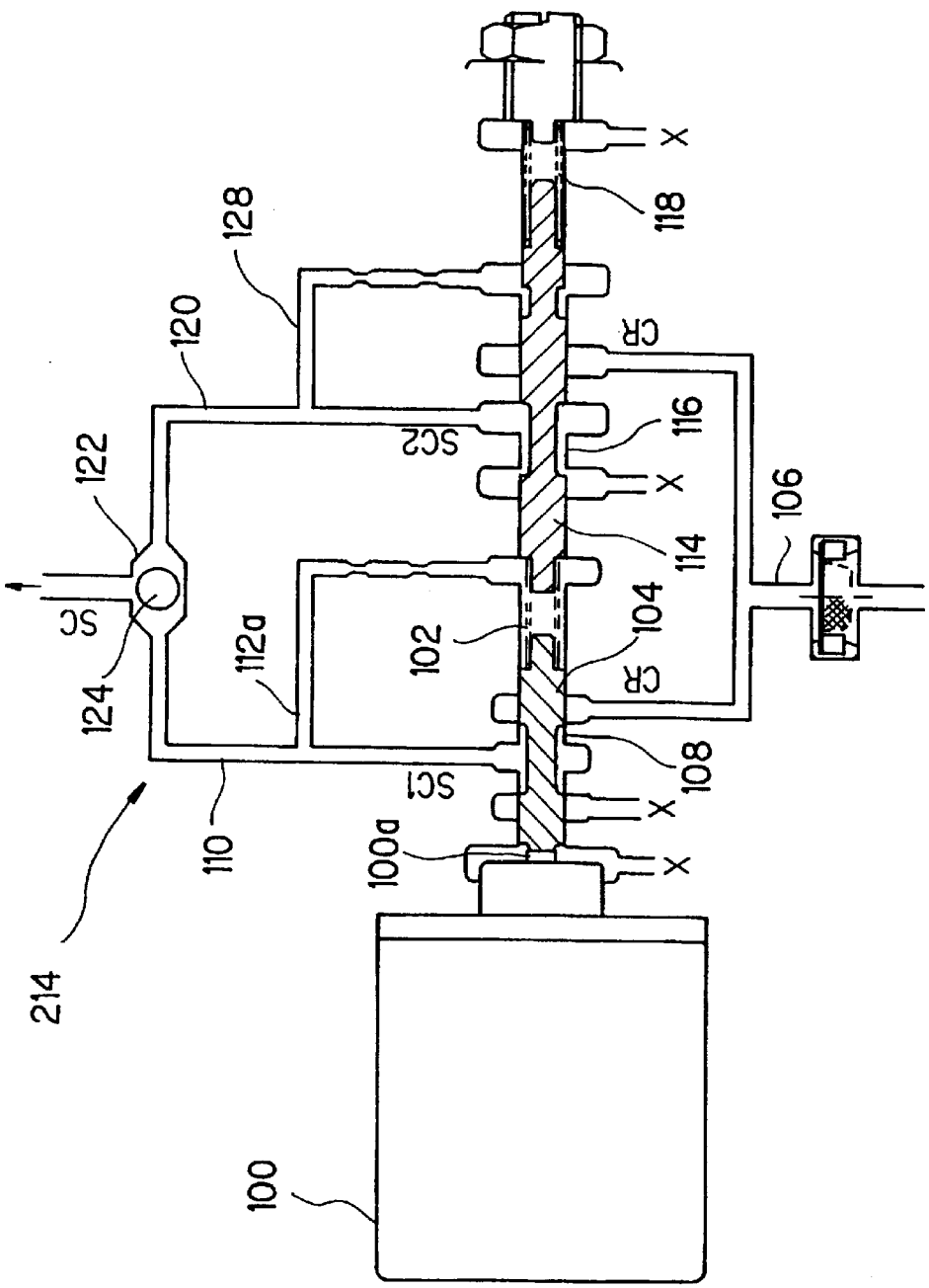
FIG. 14 is a view, similar to FIG. 6, but showing a hydraulic pressure-control valve for an automatic vehicle transmission according to a third embodiment of the invention.

FIG. 14 is a hydraulic circuit diagram similar to FIG. 6, but showing a hydraulic pressure-control valve, specifically, the clutch control valve 214 for a vehicle automatic transmission according to a third embodiment of the invention.

In the third embodiment, the valve body for accommodating the sub-valve 114 is formed in common with the first valve body 108 of the pressure-regulating valve 104.

Specifically, the valve body 108 of the pressure-regulating valve 104 is elongated and the sub-valve 114 is movably housed therein. The sub-valve 114 is accommodated to be movable in the valve body 108 with the spring 102 that biases the pressure-regulating valve 104 applying rightward force to its one end and the second spring 118 biasing it in the opposite direction.

The output pressure SC1 of the pressure-regulating valve 104 is applied to the head portion of the sub-valve 114 through the feedback line 112a to press the sub-valve 114 to the right in the drawing against the force of the spring 118. The output pressure SC2 of the sub-valve 114 is output on the output line 120 and is also applied through the feedback line 128 to press the sub-valve 114 to right in the drawing against the force of the spring 118.

The operation of the clutch control valve 214 according the third embodiment will now be explained.

The pressure-regulating valve 104 moves to the right in the drawing against the force of the spring 118 in proportion to the current passing through the solenoid 100. Upon moving a prescribed distance, it communicates the line-pressure supply line 106 and the output line 110, so that oil begins to flow through the output line 110 and the confluence point 122 to the clutch hydraulic chamber and the ball 124 is moved to the right to close the output line 120 of the sub-valve 114.

The flow rate of oil through the pressure-regulating valve 104 at this time is determined by the position of the pressure-regulating valve 104, specifically by the solenoid current (the solenoid load; more precisely, the position of the plunger 100a), the force of the spring 102 acting on the plunger 100a in the opposite direction, and the feedback pressure applied through the feedback line 112a (more precisely, the position of the sub-valve 114).

Figure 15:
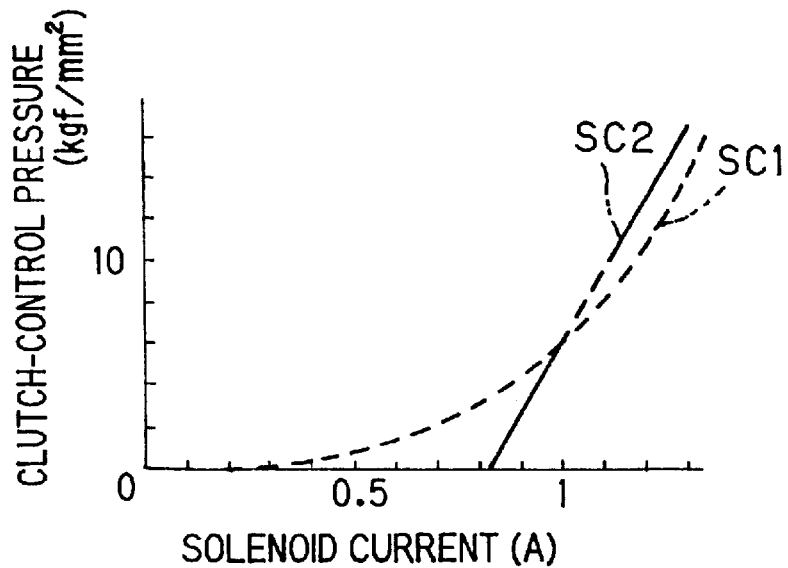
FIG. 15 is a graph showing the hydraulic pressure outputs from the hydraulic pressure-control valve illustrated in FIG. 14.

Although the force of the spring 102 is constant (linear), the feedback pressure imparts the output pressure SC1 of the pressure-regulating valve 104 with a nonlinear characteristic (first characteristic) as indicated by the dashed curve in FIG. 15.

As the output pressure SC1 of the pressure-regulating valve 104 increases, the rightward pressing force acting on the sub-valve 114 through the feedback line 112a rises to move the sub-valve 114 in the same direction and communicate the line-pressure supply line 106 with the output line 120, whereupon the output pressure SC2 is supplied through the sub-valve 114 to the confluence point 122. At the confluence point 122 it restores the ball 124 to the center position to open a flow passage, merges with the output pressure SC1 and passes to the clutch hydraulic chamber as the clutch-control pressure SC.

The characteristic of the output pressure SC2 of the sub-valve 114 is shown by the two-dot chain curve in FIG. 15. This corresponds to the aforesaid second characteristic.

Figure 16:
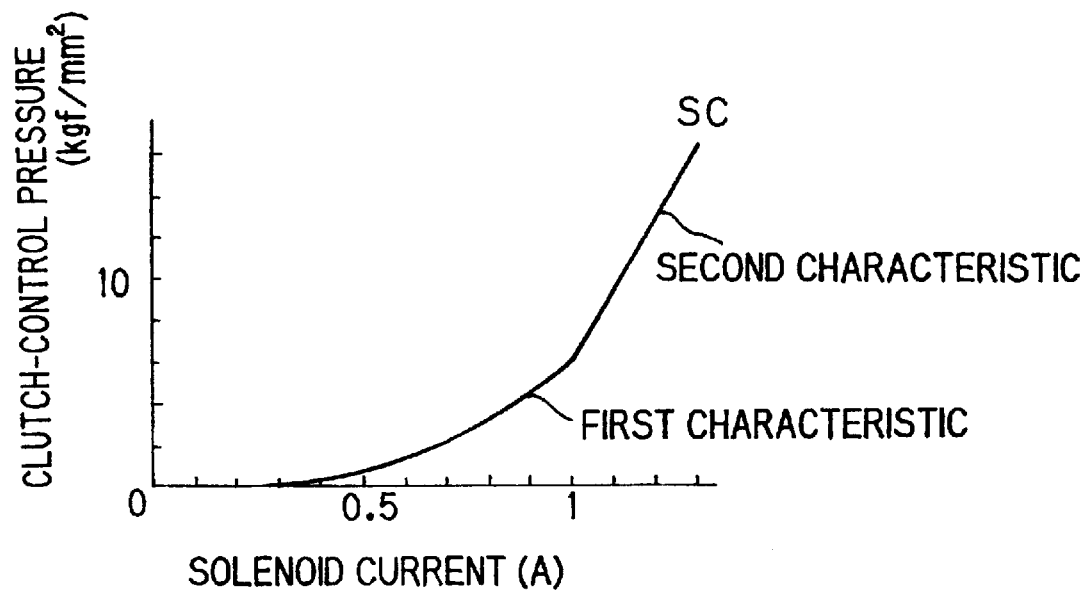
FIG. 16 is a graph showing the characteristics of hydraulic pressure output from the hydraulic pressure-control valve illustrated in FIG. 14 obtained by combining the hydraulic pressures illustrated in FIG. 15.

Therefore, as shown in FIG. 16, the oil pressure supply characteristic of the clutch control valve 214 according to the third embodiment becomes what is obtained by combining the pressure regulating-valve output characteristic (first characteristic) and the sub-valve output characteristic (second characteristic).

The pressure-regulating valve output characteristic (first characteristic) of the third embodiment of the clutch control valve 214, which is nonlinear as shown, is set to define a smaller change in clutch oil pressure per unit solenoid current than that of the second characteristic. As in the earlier embodiments, therefore, change in hysteresis occurring per unit load pressure (torque) can be reduced in the low pressure (torque) region. Moreover, even when torque capacity control gain is increased relative to solenoid load, no increase arises in torque scatter caused by solenoid load hysteresis.

Hence, no scatter arises in the obtained torque capacity, desired torque capacity can be imparted with high precision, and control accuracy can be improved. Moreover, since a command input achieves a larger pressure change in the high pressure region, the control response is good. Thus, since change in pressure per unit change in current is made large in the high pressure (high torque) region, the same torque capacity is in the prior art can be secured.

Figure 17:
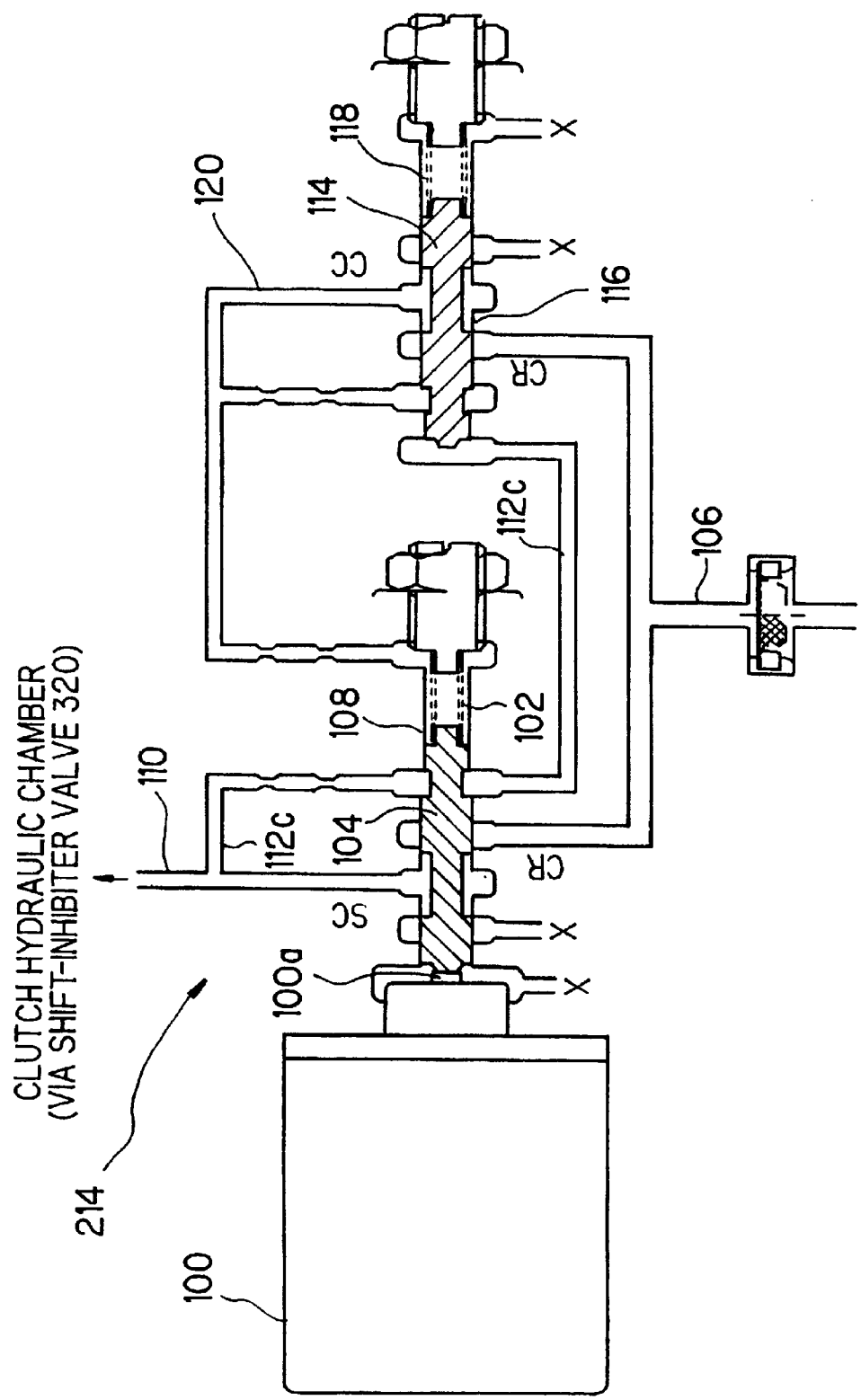
FIG. 17 is a view, similar to FIG. 6, but showing a hydraulic pressure-control valve for an automatic vehicle transmission according to a fourth embodiment of the invention.

FIG. 17 is a hydraulic circuit diagram similar to FIG. 6, but showing a hydraulic pressure-control valve (specifically the clutch control valve 214) for an automatic vehicle transmission according to a fourth embodiment of the invention.

In the clutch control valve 214 according to the fourth embodiment, as in the second embodiment, the valve body of the sub-valve is formed independently of the first valve body of the pressure-regulating valve.

Specifically, the second valve body 116 is provided and the sub-valve 114 is housed therein as biased to the left by the second spring 118. The output pressure SC of the pressure-regulating valve 104 acts on the other end of the sub-valve 114 through a feedback line 112c and presses the sub-valve 114 to the right in the drawing against the force of the spring 118.

On the other hand, the output pressure CC of the sub-valve 114 acts on the rear end of the pressure-regulating valve 104 through the output line 120 and presses the pressure-regulating valve 104 to the left in the drawing in cooperation with the force of the spring 118.

The operation of the clutch control valve according to the fourth embodiment will now be explained.

The sub-valve 114 is at first moved farther to the left than shown in the drawing by the force of the spring 118, to a position where the line-pressure supply line 106 communicates with the output line 120. When the sub-valve 114 is at its leftmost position, the flow rate is maximum and the output pressure CC is maximum.

The output pressure CC of the sub-valve 114 acts on the right end of the pressure-regulating valve 104 through the output line 120 to press the pressure-regulating valve 104 to the left in cooperation with the spring 102. As a result, communication between the line-pressure supply line 106 and the output line 110 is cut off at the pressure-regulating valve 104 to stop the flow of operating oil.

In this state, when the solenoid 100 is energized to move the plunger 100a to the right, the pressure-regulating valve 104 moves right. Upon moving a prescribed distance, it communicates the line-pressure supply line 106 and the output line 110 and the output pressure SC is supplied through the output line 110 to the clutch hydraulic chamber as the clutch-control pressure SC.

The output pressure SC of the pressure-regulating valve 104 acts on the left end of the sub-valve 114 through the feedback line 112c to move the sub-valve 114 to the right. With increasing rightward movement of the sub-valve 114, the flow rate decreases, the output pressure CC decreases and the feedback pressure acting on the right end of the pressure-regulating valve 104 decreases.

Figure 18:
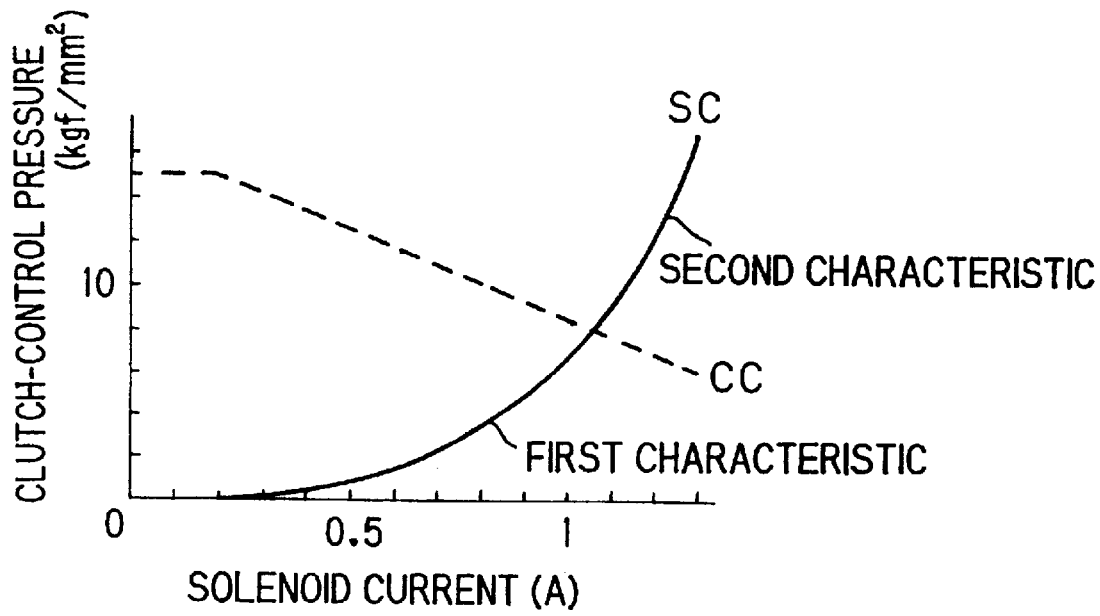
FIG. 18 is a graph showing the characteristics of hydraulic pressure output from the hydraulic pressure-control valve illustrated in FIG. 17.

The output pressure (clutch pressure) SC of the pressure-regulating valve 104 is therefore determined by the solenoid current, the biasing force of the spring 102 and the output pressure CC of the sub-valve 114 to have a nonlinear characteristic as shown in FIG. 18.

In other words, the fourth embodiment achieves the same effect as the earlier embodiments while further enabling smoother clutch pressure control as indicated by the smooth continuity of the first and second characteristics shown in FIG. 18. The fourth embodiment can provide this smooth characteristic because it supplies only the output pressure SC of the pressure-regulating valve 104 to the clutch hydraulic chamber.

Figure 19:
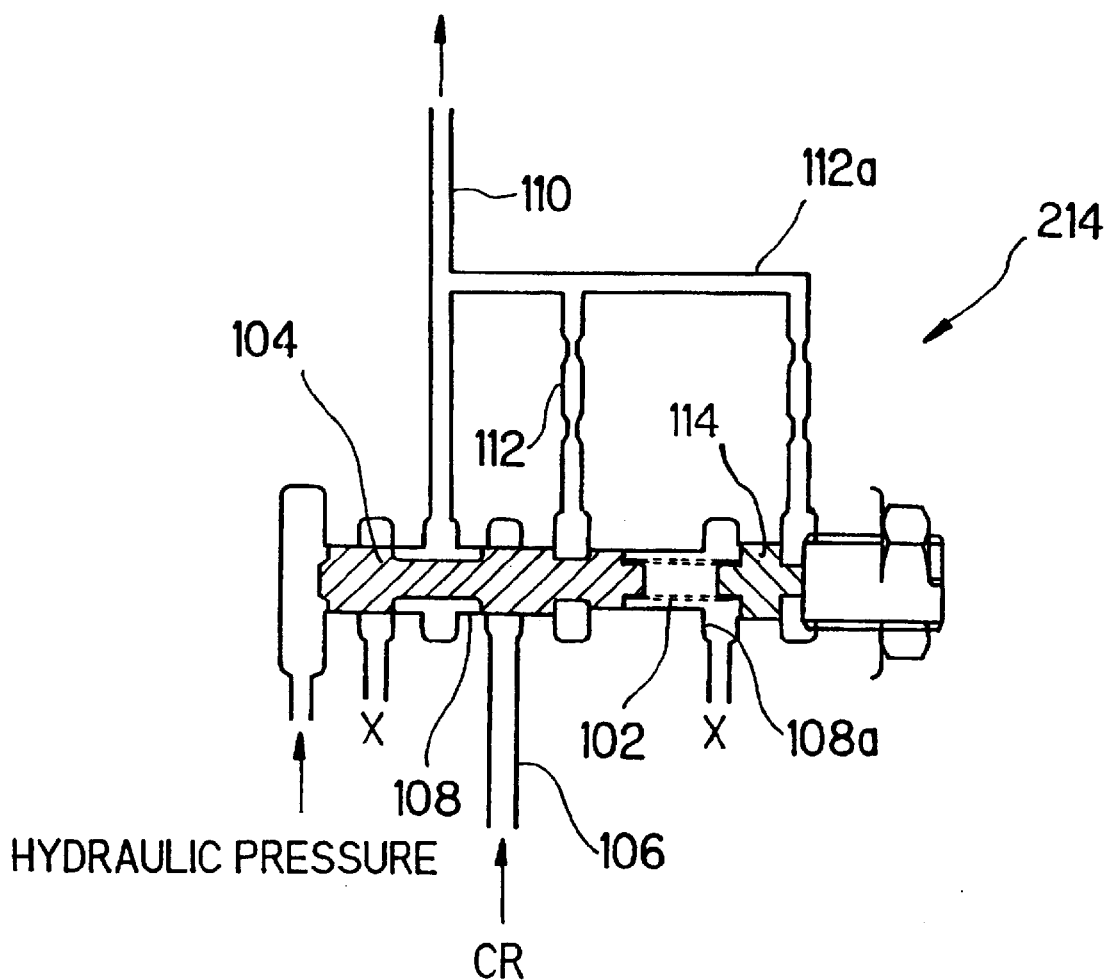
FIG. 19 is a view, similar to FIG. 6, but showing a hydraulic pressure-control valve for an automatic vehicle transmission according to a fifth embodiment of the invention.

FIG. 19 is a hydraulic circuit diagram similar to FIG. 6, but showing a hydraulic pressure-control valve, specifically the clutch control valve 214, for an automatic vehicle transmission according to a fifth embodiment of the invention.

The fifth embodiment is a modification of the foregoing embodiments. The solenoid disposed in series with the clutch control valve is omitted and the pressure-regulating valve 104 is moved by applying a pressure controlled by a circuit, not shown, to the head portion (left end) thereof. In other respects the structure is the same as that of the first embodiment. The effect is also the same.

Figure 20:
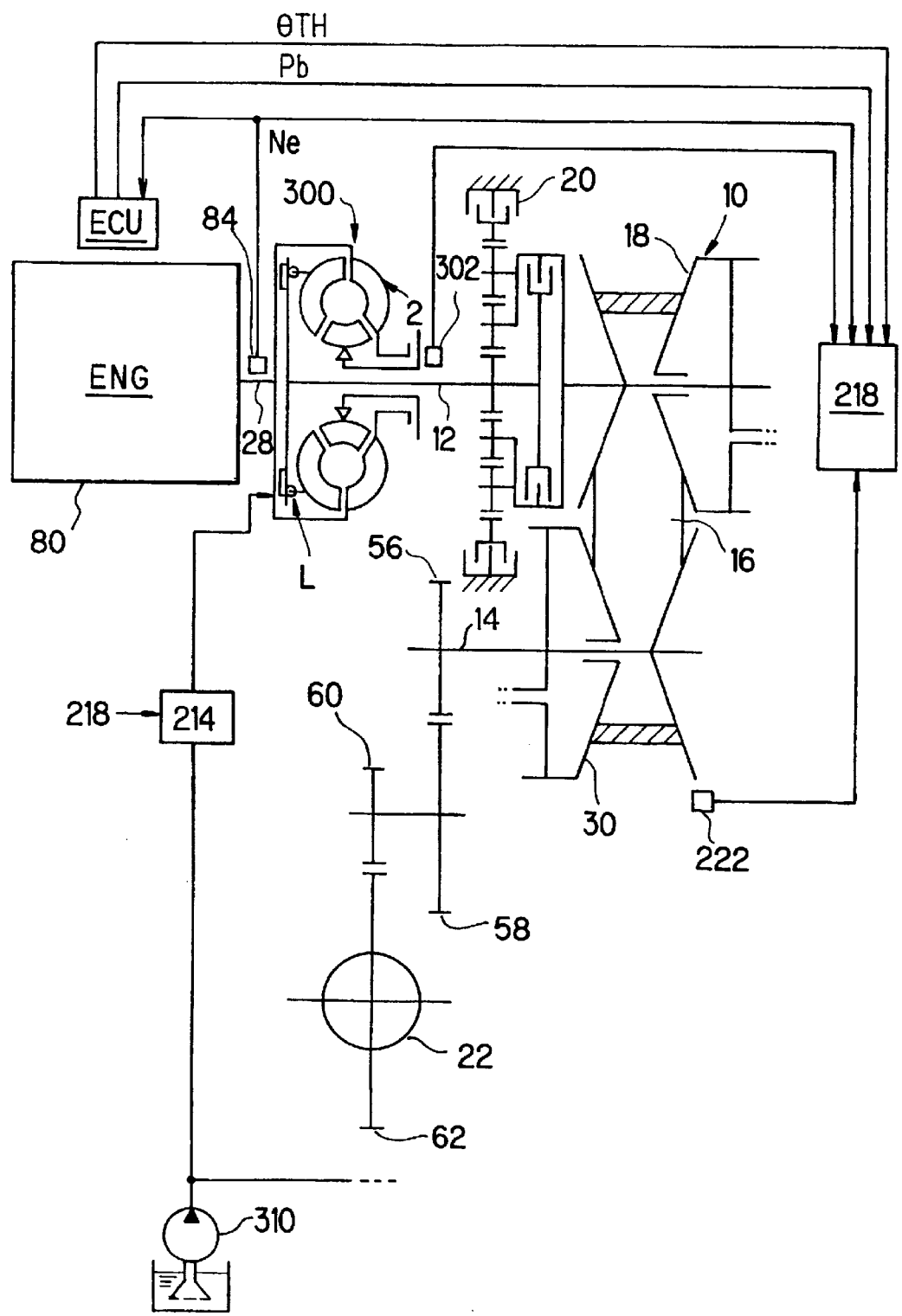
FIG. 20 is an overall schematic view showing a continuously variable transmission having a torque converter to which the hydraulic pressure-control valve according to the foregoing embodiments can be applied.

FIG. 20 is an overall schematic view showing a continuously variable transmission having a torque converter to which the hydraulic pressure-control valve according to the foregoing embodiments can be applied;

As shown in FIG. 20, a torque converter 300 is connected to the output shaft 28 of the engine 80 and the belt-drive continuously variable transmission 10 is connected at the stage following the torque converter 300. In other words, the start clutch 24 of the earlier embodiments is replaced by the torque converter 300. In FIG. 20, members like those in FIG. 1 are assigned the same reference symbols as those in FIG. 1.

The hydraulic pressure-control valve according to the foregoing embodiments can be utilized to effect pressure supply to a lock-up clutch L (frictional engagement element) of the torque converter 300.

Figure 21:
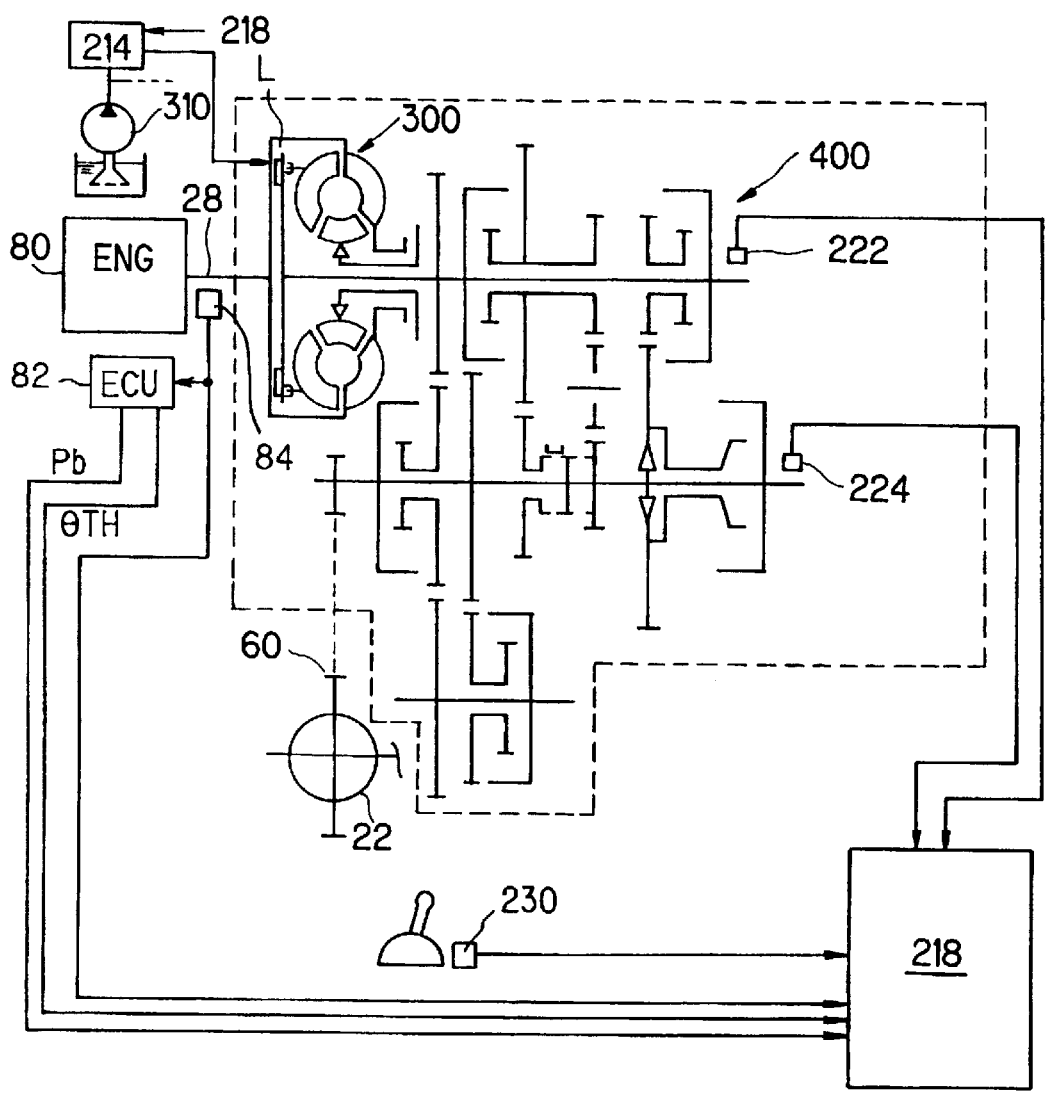
FIG. 21 is view, similar to FIG. 20, but showing a multi-step transmission having a torque converter to which the hydraulic pressure-control valve according to the foregoing embodiments can be applied.

FIG. 21 is a view, similar to FIG. 20, but showing a multi-step transmission having a torque converter to which the hydraulic pressure-control valve according to the foregoing embodiments can be applied.

As shown in FIG. 21, a torque converter 300 is connected to the output shaft 28 of the engine 80 and a multi-step transmission 400 having three axes prepared in parallel and with four forward and one reverse speed is connected as the stage following the torque converter 300. In FIG. 21, members like those in FIG. 1 are assigned the same reference symbols as those in FIG. 1. Since the illustrated configuration is explained in the Assignee's earlier Japanese Patent Application No. Hei 7(1995)-254,662, no detailed explanation will be given here. In the configuration, the hydraulic pressure-control valve according to the foregoing embodiments can be utilized in the lock-up clutch L of the torque converter 300.

The transmission shown is also known in a type wherein the torque converter 300 and the first-gear one-way clutch COW are removed and the vehicle is started in first speed. The hydraulic pressure-control valve, i.e., the clutch control valve 214 used in one of the first to fifth embodiments can also be utilized in this configuration.

It should be noted that the solenoid utilized in the foregoing embodiments of the invention can be either a linear solenoid or a duty (PWM) solenoid.

Although the foregoing description was made with respect to the case of using a continuously variable transmission of the metal belt type, the invention can also be effectively applied to one of the rubber belt type or toroidal type.

While the invention has thus been shown and described with reference to specific embodiments, it should be noted that the invention is in no way limited to the details of the described arrangements but changes and modifications may be made without departing from the scope of the appended claims.

What is claimed is:

1. A hydraulic pressure-control valve for controlling a pressure to be supplied to a frictional engaging element in an automatic vehicle transmission, including:

a hydraulic pressure source;

a first pressure-regulating valve connected to the hydraulic pressure source through a first passage to input an input hydraulic pressure from the hydraulic pressure source and connected to the frictional engaging element through a second passage;

valve displacing means for displacing the first-pressure regulating valve at one end in a first direction such that the first pressure-regulating valve outputs a first output hydraulic pressure to the frictional engaging element in response to a command input; and a second pressure-regulating valve connected, in parallel with the first pressure-regulating valve, to the hydraulic pressure source through a third passage to input the input hydraulic pressure from the hydraulic pressure source and connected to the frictional engaging element through a fourth passage to output a second output hydraulic pressure;

wherein the second pressure-regulating valve is connected to the first pressure-regulating valve to receive the first output hydraulic pressure at one end to be pressed in the first direction in such a manner that when the second pressure-regulating valve is in a first position, the second output hydraulic pressure is blocked such that the first output hydraulic pressure is output which varies by a first amount per unit of command input in response to the command input according to a characteristic, and changes in a second position in which the second output hydraulic pressure is output such that the first and second output hydraulic pressures are output which vary by a second amount.

2. A hydraulic pressure-control valve according to claim 1, wherein the second pressure-regulating valve is connected to the second passage through the fourth passage at a confluence point where a ball is provided which blocks the second output hydraulic pressure when the second pressure-regulating valve in the first position.

3. A hydraulic pressure-control valve according to claim 2, wherein the second pressure-regulating valve is pressed to the first position through a spring.

4. A hydraulic pressure-control valve according to claim 1, wherein the first pressure-regulating valve and the second pressure-regulating valve are housed in valve bodies which are separated from each other.

5. A hydraulic pressure-control valve according to claim 1, wherein the valve displacing means is a solenoid.

6. A hydraulic pressure-control valve according to claim 1, wherein the valve displacing means is a hydraulic pressure.

7. A hydraulic pressure-control valve according to claim 1, wherein the first pressure-regulating valve is pressed in a direction opposite to the first direction by a spring.

8. A hydraulic pressure-control valve according to claim 1, wherein the first pressure-regulating valve is activated by feedback pressure circuit which presses the first pressure-regulating valve in a direction opposite to the first direction by a spring.

* * * * *